(12) United States Patent
Hall et al.

(10) Patent No.: US 11,850,961 B1
(45) Date of Patent: Dec. 26, 2023

(54) CHARGING CONNECTOR WITH INTEGRATED COOLING CHANNEL

(71) Applicant: BETA AIR, LLC, South Burlington, VT (US)

(72) Inventors: Edward Hall, South Burlington, VT (US); Cole Hanson, Burlington, VT (US); Jake Pill, South Burlington, VT (US); John Charles Palombini, South Burlington, VT (US); Richard Donnelly, South Burlington, VT (US)

(73) Assignee: BETA AIR, LLC, South Burlington, VT (US)

( * ) Notice: Subject to any disclaimer, the term of this patent is extended or adjusted under 35 U.S.C. 154(b) by 0 days.

(21) Appl. No.: 17/889,475

(22) Filed: Aug. 17, 2022

(51) Int. Cl.
| | |
|---|---|
| *B60L 53/302* | (2019.01) |
| *H01R 13/62* | (2006.01) |
| *H01R 24/38* | (2011.01) |
| *H01R 13/52* | (2006.01) |
| *B64F 1/36* | (2017.01) |
| *B60L 53/16* | (2019.01) |
| *B64C 29/00* | (2006.01) |

(52) U.S. Cl.
CPC .............. *B60L 53/302* (2019.02); *B60L 53/16* (2019.02); *B64F 1/362* (2013.01); *H01R 13/5202* (2013.01); *H01R 13/62* (2013.01); *H01R 24/38* (2013.01); *B60L 2200/10* (2013.01); *B64C 29/0008* (2013.01); *H01R 2201/26* (2013.01)

(58) Field of Classification Search
CPC .......................... B60L 53/302; H01R 2201/26
USPC ........................................................ 320/126
See application file for complete search history.

(56) References Cited

U.S. PATENT DOCUMENTS

| | | | |
|---|---|---|---|
| 9,233,618 B2 | 1/2016 | Dyer et al. | |
| 10,063,077 B2 | 8/2018 | Solodovnik et al. | |
| 10,377,264 B2 | 8/2019 | Lopez et al. | |
| 11,108,245 B1 | 8/2021 | Lujan | |
| 11,203,267 B2 | 12/2021 | Prasad et al. | |
| 2005/0029867 A1 | 2/2005 | Wood | |
| 2010/0291418 A1* | 11/2010 | Zhou | H01M 50/204 |
| | | | 429/96 |
| 2013/0020993 A1 | 1/2013 | Taddeo et al. | |
| 2014/0132062 A1* | 5/2014 | Brombach | H02J 4/00 |
| | | | 307/9.1 |
| 2014/0339009 A1* | 11/2014 | Suzuki | B60K 1/00 |
| | | | 180/232 |
| 2017/0297437 A1* | 10/2017 | Kim | H02J 50/10 |

* cited by examiner

*Primary Examiner* — Suchin Parihar
(74) *Attorney, Agent, or Firm* — CALDWELL INTELLECTUAL PROPERTY LAW

(57) ABSTRACT

Aspects relate to a connector and methods of use for charging an electric aircraft. An exemplary connector includes a housing configured to mate with a port of an electric aircraft, where the housing includes a fastener for removable attachment with the electric aircraft port, at least a high-voltage conductor configured to conduct a high-voltage electrical power, at least a low-voltage conductor, configured to conduct a low-voltage electrical power, at least a control signal conductor configured to conduct a control signal, at least a ground conductor configured to conduct to a ground, at least a cooling channel configured to contain a flow of a coolant, and at least a proximity signal conductor configured to conduct a proximity signal indicative of attachment with the electric aircraft port when the housing is mated with the port.

20 Claims, 12 Drawing Sheets

CHARGING CONNECTOR WITH INTEGRATED COOLING CHANNEL

FIELD OF THE INVENTION

The present invention generally relates to the field of electric aircraft charging. In particular, the present invention is directed to a charging connector with an integrated cooling channel and corresponding methods of use for charging an electric aircraft.

BACKGROUND

Electric vehicles hold great promise in their ability to run using sustainably source energy, without increase atmospheric carbon associated with burning of fossil fuels. Perennial downsides associated with electric vehicles, include poor energy storage and therefore range of operation, as well as long times to recharge on board batteries.

SUMMARY OF THE DISCLOSURE

In an aspect, a charging connector with an integrated cooling channel is provided. The connector includes a housing configured to mate with a port of an electric aircraft, wherein the housing comprises a fastener for removable attachment with the electric vehicle port, a high-voltage conductor disposed at least partially within the housing, the high-voltage conductor configured to conduct a high-voltage electrical power, a low-voltage conductor disposed at least partially within the housing, the low-voltage conductor configured to conduct a low-voltage electrical power, a control signal conductor disposed at least partially within the housing, the control signal conductor configured to conduct a control signal, and an at least a cooling channel configured to contain a flow of a coolant, wherein, each of the high-voltage conductor, the low-voltage conductor, the control signal conductor, and the at cooling channel are configured to connect with a mating component of the port of the electric aircraft when the housing is mated with the port.

In another aspect, a method of charging, using a connector, an electric vehicle is provided. The method includes detecting, by a proximity sensor, data related to a position of a charging connector relative to a port of an electric aircraft, receiving, by a controller of the connector that is communicatively connected to the sensor, the data, initiating, by the controller, a transmission of high-voltage electrical power through a high-voltage conductor of the connector to the port and low-voltage electrical power through a low-voltage conductor of the connector to the port, activating, by the controller, a flow of coolant through at least a cooling channel of the connector.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to a charging connector and corresponding methods of use of the charging connector to charge an electric aircraft at high rates of speed and electric current, thereby facilitating fast recharging of electric aircraft. In an embodiment, aspects relate specifically to a charging connector for interfacing with an electric aircraft for recharging. Connector may include multiple interfaces for fast charging of electric aircraft. For example, and without limitation, connector may include a coolant interface to lower a temperature of one or more conductors of connector and/or to deliver coolant to a battery of electric aircraft during recharging.

Aspects of the present disclosure can be used to connect with communication, control, and/or sensor signals associated with an electric aircraft during charging, thereby allowing for monitoring of the charge and feedback control of various charging systems. Therefore, in some cases, aspects relate to systems for verifying performance of cooling and/or charging processes in between charges of electric aircraft.

Figure 1A:
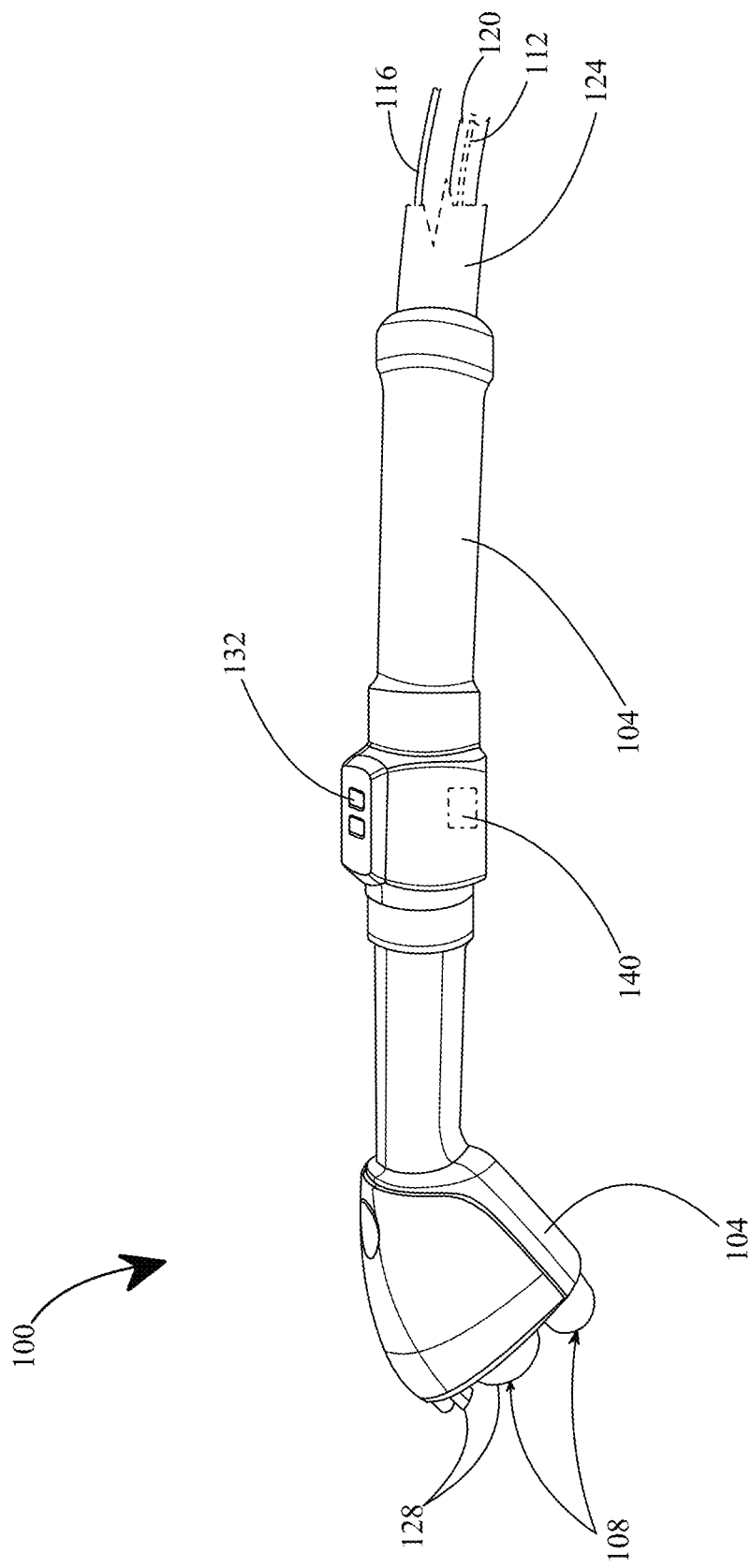
FIGS. 1A and 1B are exemplary schematics of an exemplary embodiment of a charging connector in accordance with one or more embodiments of the present disclosure.
Figure 1B:
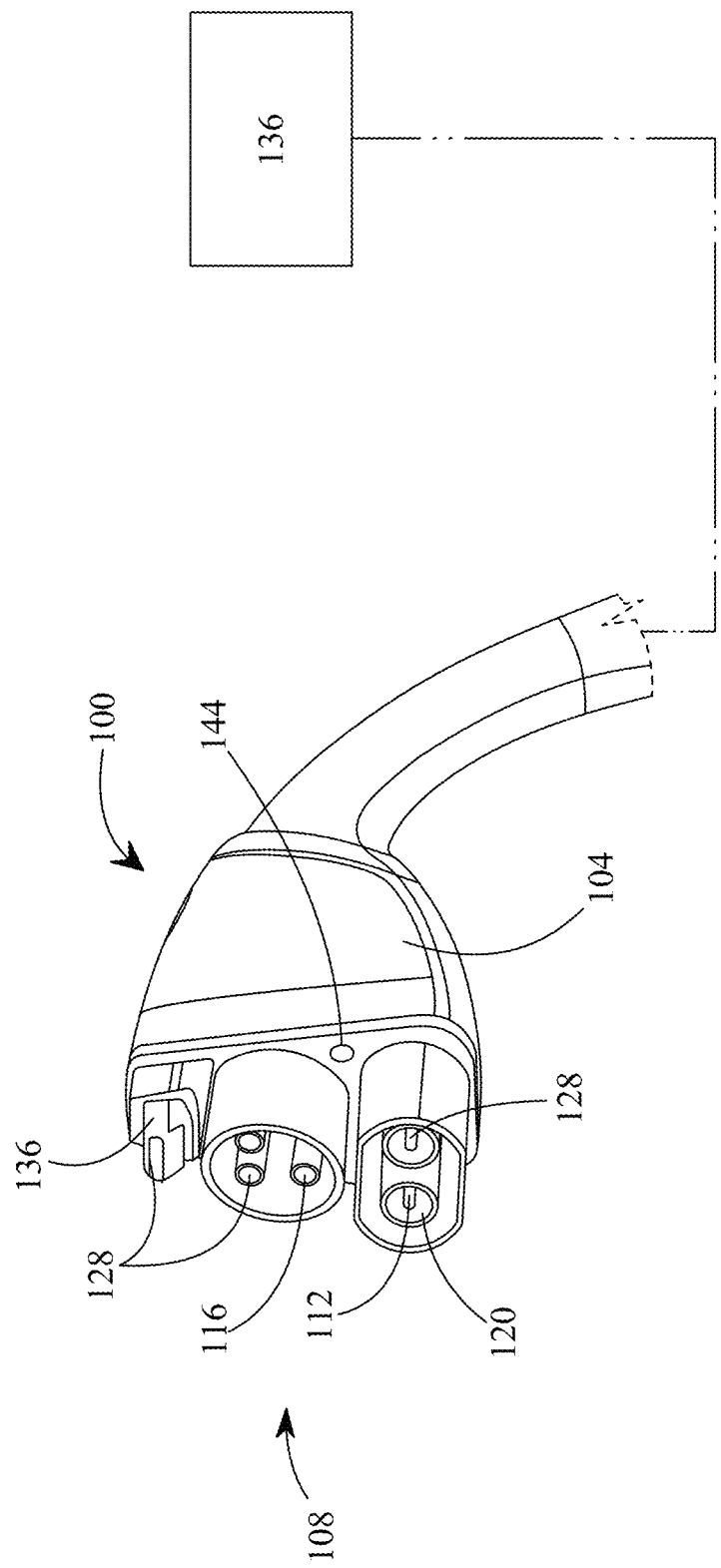

Referring now to the drawings wherein the showings are for purposes of illustrating embodiments of the present disclosure only, and not for purposes of limiting the same, FIGS. 1A and 1B illustrate an exemplary embodiment of a charging connector 100 with an integrated cooling channel. As shown in FIG. 1A, charging connector 100 (also referred to herein as a "connector") facilitates transfer of electrical power between a power source of a charging station and an electric aircraft, such as a power source of the electric aircraft and/or electrical systems of the electric aircraft. As used in this disclosure, "charging" refers to a process of increasing energy stored within an energy source. In some cases, and without limitation, an energy source may include a battery and charging may include providing electrical power, such as an electrical current, to the battery.

In one or more embodiments, and still referring to FIG. 1A, connector 100 may include a distal end of a flexible tether 124 or a bundle of tethers, e.g., hose, tubing, cables, wires, and the like, attached to a charging unit, such as a charging station or charger. Connector 100 is configured to connect charging unit to an electric aircraft to create an electrical communication between charging unit and electric aircraft, as discussed further in this disclosure. Connector 100 may be configured to removably attach to a port of electric aircraft using, for example, a mating component 128. As used in this disclosure, a "port" is an interface for example of an interface configured to receive another component or an interface configured to transmit and/or receive signal on a computing device. For example, and without limitation, in the case of an electric aircraft port, the port interfaces with a number of conductors 108 and/or a cooling channel 120 by way of receiving connector 100. In the case of a computing device port, the port may provide an interface between a signal and a computing device. A connector may include a male component having a penetrative form and port may include a female component having a receptive form, receptive to the male component. Alternatively or additionally, connector may have a female component and port may have a male component. In some cases, connector may include multiple connections, which may make contact and/or communicate with associated mating components within port, when the connector is mated with the port.

With continued reference to FIG. 1A, connector 100 may include a housing 104. As used in this disclosure, a "housing" is a physical component within which other internal components may be disposed at least partially within. In some cases, housing 104 may protect internal components of connector 100. Housing 104 may be made from various materials, such as metal alloy, aluminum, steel, plastic, synthetic material, semi-synthetic material, polymer, and the like. In some embodiments, housing 104 may be monolithic. In other embodiments, housing 104 may include a plurality of assembled components. Housing 104 and/or connector 100 may be configured to mate with a port of an electric aircraft using a mating component 128. As used in this disclosure, a "mating component" is a device or mechanism that allows an action of attaching two or more components together. As used in this disclosure, a "port" is a connection point and/or interface of an electric aircraft that allows electrical power to be transferred between electric aircraft and an external electrical device, such as a charging unit. Mating component 128 may include a mechanical or electromechanical mechanism described in this disclosure. For example, without limitation mating may include an electromechanical device used to join electrical conductors and create an electrical circuit. In some cases, mating component 128 may include gendered mating components. Gendered mating components may include a male component, such as a plug, which is inserted within a female component, such as a socket. In some cases, mating between mating components may be removable. In some cases, mating between mating components may be permanent. In some cases, mating may be removable, but require a specialized tool or key for removal. Mating may be achieved by way of one or more of plug and socket mates, pogo pin contact, crown spring mates, and the like. In some cases, mating may be keyed to ensure proper alignment of connector 100. In some cases, mate may be lockable. In one or more embodiments, housing 104 may include controls 132. Controls 132 may be actuated by a user to initiate, terminate, and/or modify parameters charging. For example, and without limitation, a button of controls 132 may be depressed by a user to initiate a transfer of electrical power from charging unit to electric aircraft. Controls 132 may include buttons, switches, slides, a touchscreen, joystick, and the like. In some embodiments, controls 132 may include a screen that displays information related to the charging of an energy source. For example, and without limitation, screen may display an amperage or voltage of electrical power being transferred to energy source of electric aircraft. Screen may also display a calculated amount of time until energy source is charged to a desired amount (e.g., desired state of charge). Screen may also display data detected by components, such as a sensor, of connector and/or electric aircraft. For example, and without limitation, screen may display a temperature of an energy source of electric aircraft. In an exemplary embodiment, a user may actuate, for example, a switch, of control 132 to initiate a cooling of a component of connector 100 and/or electric aircraft in response to displayed information and/or data on screen of connector 100. Initiating of a cooling of one or more embodiments of connector 100 may include a coolant source displacing a coolant within a cooling channel, as discussed further in this disclosure below. Controlling a transmission of electrical power and/or charging of an electric aircraft using a connector may be consistent with charging described in U.S. Nonprovisional application Ser. No. 17/405,840, filed on Aug. 18, 2021, and entitled "CONNECTOR AND METHODS OF USE FOR CHARGING AN ELECTRIC VEHICLE", U.S. Nonprovisional application Ser. No. 17/407,358, filed on Aug. 20, 2021, and entitled "CONNECTOR AND METHOD FOR USE FOR AUTHORIZING BATTERY CHARGING FOR AN ELECTRIC VEHICLE", U.S. Nonprovisional application Ser. No. 17/515,508, filed on Oct. 31, 2021, and entitled "CONNECTOR WITH AMBIENCE MONITORING CAPABILITY AND METHODS OF USE FOR CHARGING AN ELECTRIC AIRCRAFT", the entirety of each one of which is incorporated herein by reference.

With continued reference to FIG. 1A, mating component 128 of housing 104 may include a fastener. As used in this disclosure, a "fastener" is a physical component that is designed and/or configured to attach or fasten two or more components together. Connector 100 may include one or more attachment components or mechanisms, for example without limitation fasteners, threads, snaps, canted coil springs, and the like. In some cases, connector may be connected to port by way of one or more press fasteners. As used in this disclosure, a "press fastener" is a fastener that couples a first surface to a second surface when the two surfaces are pressed together. Some press fasteners include elements on the first surface that interlock with elements on the second surface; such fasteners include without limitation hook-and-loop fasteners such as VELCRO fasteners produced by Velcro Industries B.V. Limited Liability Company of Curacao Netherlands, and fasteners held together by a plurality of flanged or "mushroom"-shaped elements, such as 3M DUAL LOCK fasteners manufactured by 3M Company of Saint Paul, Minnesota. Press-fastener may also include adhesives, including reusable gel adhesives, GECK-SKIN adhesives developed by the University of Massachusetts in Amherst, of Amherst, Massachusetts, or other reusable adhesives. Where press-fastener includes an adhesive, the adhesive may be entirely located on the first surface of the press-fastener or on the second surface of the press-fastener, allowing any surface that can adhere to the adhesive to serve as the corresponding surface. In some cases, connector may be connected to port by way of magnetic force. For example, connector may include one or more of a magnetic, a ferro-magnetic material, and/or an electro-magnet. Fastener may be configured to provide removable attachment between connector 100 and port of electric aircraft. As used in this disclosure, "removable attachment" is an attributive term that refers to an attribute of one or more relata to be attached to and subsequently detached from another relata; removable attachment is a relation that is contrary to permanent attachment wherein two or more relata may be attached without any means for future detachment. Exemplary non-limiting methods of permanent attachment include certain uses of adhesives, glues, nails, engineering interference (i.e., press) fits, and the like. In some cases, detachment of two or more relata permanently attached may result in breakage of one or more of the two or more relata.

With continued reference to FIG. 1A, connector 100 may include a controller 140. Controller 140 may include any computing device as described in this disclosure, including without limitation a microcontroller, microprocessor, digital signal processor (DSP), control circuit, and/or system on a chip (SoC) as described in this disclosure. Computing device may include, be included in, and/or communicate with a mobile device such as a mobile telephone or smartphone. Controller 140 may include a single computing device operating independently, or may include two or more computing device operating in concert, in parallel, sequentially or the like; two or more computing devices may be included together in a single computing device or in two or more computing devices. Controller 140 may interface or communicate with one or more additional devices as described below in further detail via a network interface device. Network interface device may be utilized for connecting controller 140 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Controller 140 may include but is not limited to, for example, a computing device or cluster of computing devices in a first location and a second computing device or cluster of computing devices in a second location. Controller 140 may include one or more computing devices dedicated to data storage, security, distribution of traffic for load balancing, and the like. Controller 140 may distribute one or more computing tasks as described below across a plurality of computing devices of computing device, which may operate in parallel, in series, redundantly, or in any other manner used for distribution of tasks or memory between computing devices. Controller 140 may be implemented using a "shared nothing" architecture in which data is cached at the worker, in an embodiment, this may enable scalability of connector 100 and/or computing device.

With continued reference to FIG. 1A, controller 140 may be designed and/or configured to perform any method, method step, or sequence of method steps in any embodiment described in this disclosure, in any order and with any degree of repetition. For instance, controller 140 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. controller 140 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1A, connector 100 may include one or more charging cables that each include a conductor 108, which has a distal end approximately located within connector 100 and a proximal end approximately located at an energy source of charging unit. As used in this disclosure, a "conductor" is a component that facilitates conduction. As used in this disclosure, "conduction" is a process by which one or more of heat and/or electricity is transmitted through a substance, for example, when there is a difference of effort (i.e., temperature or electrical potential) between adjoining regions. In some cases, conductor 108 may be configured to charge and/or recharge electric aircraft. For instance, conductor 108 may be connected to an energy source of a charging unit and conductor may be designed and/or configured to facilitate a specified amount of electrical power, current, or current type. For example, conductor 108 may include a direct current conductor. As used in this disclosure, a "direct current conductor" is a conductor configured to carry a direct current for recharging an energy source of electric aircraft. As used in this disclosure, "direct current" is one-directional flow of electric charge. In some cases, conductor may include an alternating current conductor. As used in this disclosure, an "alternating current conductor" is a conductor configured to carry an alternating current for recharging an energy source of electric aircraft **. As used in this disclosure, an "alternating current" is a flow of electric charge that periodically reverse direction; in some cases, an alternating current may change its magnitude continuously with in time (e.g., sine wave).

In one or more embodiments, and still referring to FIG. 1A, conductor 108 may include a high-voltage conductor 112. In a non-limiting embodiment, high-voltage conductor 112 may be configured for a potential no less than 100 V. In some embodiments, high-voltage conductor may include a direct current (DC) conductor. High-voltage conductor 112 may include a DC conductor pin, which extends from housing 104 and allows for the flow of DC power into and out of the electric aircraft via port. In other embodiments, high-voltage conductor 112 may include an alternating current (AC) conductor. An AC conductor may include any component responsible for the flow of AC power into and out of the electric aircraft. The AC conductor may include a pin that extends from housing 104 that may allow for a transfer of electrical power between connector and power source of electrical aircraft. In some embodiments, a pin of high-voltage conductor 112 may include a live pin, such that the pin is the supply of DC or AC power. In other embodiments, pin of high-voltage conductor 112 may include a neutral pin, such that the pin is the return path for DC or AC power.

With continued reference to FIG. 1A, conductor may include a low-voltage conductor 116. In a non-limiting embodiment, low-voltage conductor 116 may be configured for a potential no greater than 100 V. Low-voltage conductor 116 may be configured for AC or DC current. In one or more embodiments, low-voltage conductor 116 may be used as an auxiliary charging connector to power auxiliary equipment of electric aircraft. In some embodiments, auxiliary equipment may only be powered using low-voltage conductor 116 such that auxiliary equipment is not powered after charging, thus, auxiliary equipment may be off during in-flight activities.

With continued reference to FIG. 1A, high-voltage conductor 112 and low-voltage conductor 116 may receive an electrical charging current from an energy source of charging unit. As used in this disclosure, an "energy source" is a source of electrical power, for example, for charging a battery. In some cases, energy source may include a charging battery (i.e., a battery used for charging other batteries). A charging battery is notably contrasted with an electric aircraft energy source or battery, which is located for example upon electric aircraft. As used in this disclosure, an "electrical charging current" is a flow of electrical charge that facilitates an increase in stored electrical energy of an energy storage, such as without limitation a battery. Charging battery may include a plurality of batteries, battery modules, and/or battery cells. Charging battery may be configured to store a range of electrical energy, for example a range of between about 5 KWh and about 5,000 KWh. Energy source may house a variety of electrical components. In one embodiment, energy source may contain a solar inverter. Solar inverter may be configured to produce on-site power generation. In one embodiment, power generated from solar inverter may be stored in a charging battery. In some embodiments, charging battery may include a used electric aircraft battery no longer fit for service in an aircraft.

In some embodiments, and still referring to FIG. 1A, charging battery may have a continuous power rating of at least 350 kVA. In other embodiments, charging battery may have a continuous power rating of over 350 kVA. In some embodiments, charging battery may have a battery charge range up to 950 Vdc. In other embodiments, charging battery may have a battery charge range of over 950 Vdc. In some embodiments, charging battery may have a continuous charge current of at least 350 amps. In other embodiments, charging battery may have a continuous charge current of over 350 amps. In some embodiments, charging battery may have a boost charge current of at least 500 amps. In other embodiments, charging battery may have a boost charge current of over 500 amps. In some embodiments, charging battery may include any component with the capability of recharging an energy source of an electric vehicle. In some embodiments, charging battery may include a constant voltage charger, a constant current charger, a taper current charger, a pulsed current charger, a negative pulse charger, an IUI charger, a trickle charger, and a float charger.

In one or more embodiments, and still referring to FIG. 1A, conductor 108 may be an electrical conductor, for example, a wire and/or cable, as previously mentioned above in this disclosure. Exemplary conductor materials may include metals, such as without limitation copper, nickel, steel, and the like. In one or more embodiments, conductor may be disposed within an insulation, such as an insulation sleeve that conductor is at least partially disposed within. For example, and without limitation, conductor 108 may be covered by insulation except for at conductor pin, which may contact a component or interface of port of electric aircraft as part of mating component 128. As used in this disclosure, "communication" is an attribute wherein two or more relata interact with one another, for example within a specific domain or in a certain manner. In some cases, communication between two or more relata may be of a specific domain, such as without limitation electric communication, fluidic communication, informatic communication, mechanic communication, and the like. As used in this disclosure, "electric communication" is an attribute wherein two or more relata interact with one another by way of an electric current or electricity in general. As used in this disclosure, "fluidic communication" is an attribute wherein two or more relata interact with one another by way of a fluidic flow or fluid in general. As used in this disclosure, "informatic communication" is an attribute wherein two or more relata interact with one another by way of an information flow or information in general. As used in this disclosure, "mechanic communication" is an attribute wherein two or more relata interact with one another by way of mechanical means, for instance mechanic effort (e.g., force) and flow (e.g., velocity).

Now referring to FIG. 1B, in some embodiments, a charging unit may additionally include an alternating current to direct current converter configured to convert an electrical charging current from an alternating current. As used in this disclosure, an "analog current to direct current converter" is an electrical component that is configured to convert analog current to digital current. An analog current to direct current (AC-DC) converter may include an analog current to direct current power supply and/or transformer. In some cases, AC-DC converter may be located within an electric vehicle and conductors may provide an alternating current to the electric vehicle by way of conductors 108 and connector 100. Alternatively and/or additionally, in some cases, AC-DC converter may be located outside of electric aircraft and an electrical charging current may be provided by way of a direct current to the electric vehicle. In some cases, AC-DC converter may be used to recharge a charging batter. In some cases, AC-DC converter may be used to provide electrical power to one or more of coolant source 136, charging battery, and/or controller 140. In some embodiments, charging battery may have a connection to grid power component. Grid power component may be connected to an external electrical power grid. In some embodiments, grid power component may be configured to slowly charge one or more batteries in order to reduce strain on nearby electrical power grids. In one embodiment, grid power component may have an AC grid current of at least 450 amps. In some embodiments, grid power component may have an AC grid current of more or less than 450 amps. In one embodiment, grid power component may have an AC voltage connection of 480 Vac. In other embodiments, grid power component may have an AC voltage connection of above or below 480 Vac. In some embodiments, charging battery may provide power to the grid power component. In this configuration, charging battery may provide power to a surrounding electrical power grid.

With continued reference to FIG. 1B, a conductor 108 may include a control signal conductor configured to conduct a control signal. As used in this disclosure, a "control signal conductor" is a conductor configured to carry a control signal, such as a control signal between an electric aircraft and a charging unit. As used in this disclosure, a "control signal" is an electrical signal that is indicative of information. In this disclosure, "control pilot" is used interchangeably in this application with control signal. In some cases, a control signal may include an analog signal or a digital signal. In some cases, control signal may be communicated from one or more sensors, for example located within electric vehicle (e.g., within an electric vehicle battery) and/or located within connector 100. For example, in some cases, control signal may be associated with a battery within an electric vehicle. For example, control signal may include a battery sensor signal. As used in this disclosure, a "battery sensor signal" is a signal representative of a characteristic of a battery. In some cases, battery sensor signal may be representative of a characteristic of an electric vehicle battery, for example as electric vehicle battery is being recharged. In some versions, controller 140 may additionally include a sensor interface configured to receive a battery sensor signal. Sensor interface may include one or more ports, an analog to digital converter, and the like. Controller 140 may be further configured to control one or more of electrical charging current and coolant flow as a function of sensor signal from a sensor 144 and/or control signal. For example, controller 140 may control a coolant source 136 and/or charging battery as a function of a battery sensor signal and/or control signal. In some cases, battery sensor signal may be representative of battery temperature. In some cases, battery sensor signal may represent battery cell swell. In some cases, battery sensor signal may be representative of temperature of electric vehicle battery, for example temperature of one or more battery cells within an electric vehicle battery. In some cases, a sensor, a circuit, and/or a controller 140 may perform one or more signal processing steps on a signal. For instance, sensor, circuit or controller 140 may analyze, modify, and/or synthesize a signal in order to improve the signal, for instance by improving transmission, storage efficiency, or signal to noise ratio.

Exemplary methods of signal processing may include analog, continuous time, discrete, digital, nonlinear, and statistical. Analog signal processing may be performed on non-digitized or analog signals. Exemplary analog processes may include passive filters, active filters, additive mixers, integrators, delay lines, compandors, multipliers, voltage-controlled filters, voltage-controlled oscillators, and phase-locked loops. Continuous-time signal processing may be used, in some cases, to process signals which varying continuously within a domain, for instance time. Exemplary non-limiting continuous time processes may include time domain processing, frequency domain processing (Fourier transform), and complex frequency domain processing. Discrete time signal processing may be used when a signal is sampled non-continuously or at discrete time intervals (i.e., quantized in time). Analog discrete-time signal processing may process a signal using the following exemplary circuits sample and hold circuits, analog time-division multiplexers, analog delay lines and analog feedback shift registers. Digital signal processing may be used to process digitized discrete-time sampled signals. Commonly, digital signal processing may be performed by a computing device or other specialized digital circuits, such as without limitation an application specific integrated circuit (ASIC), a field-programmable gate array (FPGA), or a specialized digital signal processor (DSP). Digital signal processing may be used to perform any combination of typical arithmetical operations, including fixed-point and floating-point, real-valued and complex-valued, multiplication and addition. Digital signal processing may additionally operate circular buffers and lookup tables. Further non-limiting examples of algorithms that may be performed according to digital signal processing techniques include fast Fourier transform (FFT), finite impulse response (FIR) filter, infinite impulse response (IIR) filter, and adaptive filters such as the Wiener and Kalman filters. Statistical signal processing may be used to process a signal as a random function (i.e., a stochastic process), utilizing statistical properties. For instance, in some embodiments, a signal may be modeled with a probability distribution indicating noise, which then may be used to reduce noise in a processed signal.

With continued reference to FIG. 1B, a conductor 108 may include a ground conductor. As used in this disclosure, a "ground conductor" is a conductor configured to be in electrical communication with a ground. As used in this disclosure, a "ground" is a reference point in an electrical circuit, a common return path for electric current, or a direct physical connection to the earth. Ground may include an absolute ground such as earth or ground may include a relative (or reference) ground, for example in a floating configuration.

With continued reference to FIG. 1B, connector 100 may include a cooling channel 120. Cooling channel 120 may have a distal end located substantially at connector 100, and cooling channel 120 may have a proximal end located at a coolant source 136, as discussed further below in this disclosure. As used in this disclosure, a "cooling channel" is a component that is substantially impermeable to a coolant and contains and/or directs a coolant flow. As used in this disclosure, "coolant" is any flowable heat transfer medium. Coolant may include a fluid, such as a liquid or a gas. Coolant may include a compressible fluid and/or a non-compressible fluid. Coolant may include compressed air, liquid coolant, gas coolant, and the like. Coolant may include a non-electrically conductive liquid such as a fluorocarbon-based fluid, such as without limitation Fluorinert™ from 3M of Saint Paul, Minnesota, USA. In some cases, coolant may include air. As used in this disclosure, a "flow of coolant" is a stream of coolant. In some cases, coolant may include a fluid and coolant flow is a fluid flow. Alternatively or additionally, in some cases, coolant may include a solid (e.g., bulk material) and coolant flow may include motion of the solid. Exemplary forms of mechanical motion for bulk materials include fluidized flow, augers, conveyors, slumping, sliding, rolling, and the like. In some cases, cooling channel 120 may be a separate component positioned within housing 104, such as a polymeric tube. In other cases, cooling channel 120 may be an integrated component, such as a molded component disposed within a housing 104 created using a mold form. In other cases, cooling channel 120 may be a combination of both an integrated component and a molded component. In one or more embodiments, cooling channel 120 may include any component responsible for the flow of coolant into and/or out of electric aircraft. Cooling channel 120 may solely cool (e.g., reduce a current temperature) connecter 100 such that the coolant flows through or next to the cables within the connector. For example, and without limitation, cooling channel may reduce the temperature of one or more conductors 108 of connector 100. Cooling channel 120 may include any component, such as a sensor, responsible for transmitting signals describing a cooling of electric aircraft or charging connector, such as cooling requirements, current temperature, maximum and/or minimum temperature, and the like. Cooling channel 120 may assist in rapid charging of an energy source of electric aircraft such that coolant assistants in cooling down the electrical components to aid in faster charging. Flow of coolant through cooling channel 120 may be initiated by controller 140. Controller 140 may initiate and/or terminate a flow of coolant through cooling channels 120 as a function of detected data by sensor 144 of connector 100 or a sensor of electric aircraft, as discussed further below in this disclosure.

In one or more embodiments, and still referring to FIG. 1B, high-voltage conductor 112 may be disposed within cooling channel 120 (also see FIG. 1A). For instance, and without limitation, high-voltage conductor may be disposed coaxially within cooling channel 120. Thus, high-voltage conductor may traverse along the center of cooling channel 120 so that coolant may surround high-voltage conductor 112 and reduce a temperature of high-voltage conductor 112 during charging of electric aircraft. Similarly, low-voltage conductor 116 may be coaxially disposed within cooling channel 120. Conductors 108 may all be disposed within cooling channel 120, each separated by an insulator, or conductors 108 may each be disposed within a corresponding cooling channel 120, wherein each cooling channel 120 is in fluidic communication with coolant source 136. In other embodiments, cooling channel 120 may abut one or more conductors 108 to cool conductors 108 and/or connector 100. For example, and without limitations, cooling channel 120 may physically abut at least one of the high-voltage conductor 112 and the low-voltage conductor 116.

In one or more embodiments, and still referring to FIG. 1B, cooling channel 120 may be in fluidic communication with coolant source 136. As used in this disclosure, a "coolant source" is an origin, generator, reservoir, or flow producer of coolant. In some cases, a coolant source 136 may include a flow producer, such as a fan and/or a pump. Coolant source 136 may include any of following non-limiting examples, air conditioner, refrigerator, heat exchanger, pump, fan, expansion valve, and the like. In some embodiments, coolant source 136 may be further configured to transfer heat between coolant, for example coolant belonging to coolant flow, and an ambient air. As used in this disclosure, "ambient air" is air which is proximal a system and/or subsystem, for instance the air in an environment which a system and/or sub-system is operating. For example, in some cases, coolant source 136 comprises a heart transfer device between coolant and ambient air. Exemplary heat transfer devices include, without limitation, chillers, Peltier junctions, heat pumps, refrigeration, air conditioning, expansion or throttle valves, heat exchangers (air-to-air heat exchangers, air-to-liquid heat exchangers, shell-tube heat exchangers, and the like), vapor-compression cycle system, vapor absorption cycle system, gas cycle system, Stirling engine, reverse Carnot cycle system, and the like. In some versions, controller 140 may be further configured to control a temperature of coolant. For instance, in some cases, a sensor may be located within thermal communication with coolant, such that sensor is able to detect, measure, or otherwise quantify temperature of coolant within a certain acceptable level of precision. In some cases, sensor may include a thermometer. Exemplary thermometers include without limitation, pyrometers, infrared non-contacting thermometers, thermistors, thermocouples, and the like. In some cases, thermometer may transduce coolant temperature to a coolant temperature signal and transmit the coolant temperature signal to controller 140. Controller 140 may receive coolant temperature signal and control heat transfer between ambient air and coolant as a function of the coolant temperature signal. Controller 140 may use any control method and/or algorithm used in this disclosure to control heat transfer, including without limitation proportional control, proportional-integral control, proportional-integral-derivative control, and the like. In some cases, controller 140 may be further configured to control temperature of coolant within a temperature range below an ambient air temperature. As used in this disclosure, an "ambient air temperature" is temperature of an ambient air. An exemplary non-limiting temperature range below ambient air temperature is about −5° C. to about −30° C. In some embodiments, coolant flow may substantially be comprised of air. In some cases, coolant flow may have a rate within a range a specified range. A non-limiting exemplary coolant flow range may be about 0.1 CFM and about 100 CFM. In some cases, rate of coolant flow may be considered as a volumetric flow rate. Alternatively or additionally, rate of coolant flow may be considered as a velocity or flux. In some embodiments, coolant source 124 may be further configured to transfer heat between a heat source, such as without limitation ambient air or chemical energy, such as by way of combustion, and coolant, for example coolant flow. In some cases, coolant source 124 may heat coolant, for example above ambient air temperature, and/or cool coolant, for example below an ambient air temperature. In some cases, coolant source 124 may be powered by electricity, such as by way of one or more electric motors. Alternatively or additionally, coolant source 124 may be powered by a combustion engine, for example a gasoline powered internal combustion engine. In some cases, coolant flow may be configured, such that heat transfer is facilitated between coolant flow and at least a battery, by any methods known and/or described in this disclosure. In some cases, at least a battery may include a plurality of pouch cells. In some cases, heat is transferred between coolant flow and one or more components of at least a pouch cell, including without limitation electrical tabs, pouch and the like. In some cases, coolant flow may be configured to facilitate hear transfer between the coolant flow and at least a conductor of electric vehicle, including without limitation electrical busses within at least a battery.

Still referring to FIG. 1B, in some embodiments, coolant source 136 may occur synchronously and/or asynchronously with charging. For example, in some case, coolant source 136 may be configured to provide a flow of coolant prior to charging a battery of an electric vehicle. In some embodiments, cooling channel 120 may facilitate fluidic and/or thermal communication with coolant source 136 and at least a battery when connector 100 is connected to port 112. Alternatively and/or additionally, cooling channel 120 may facilitate fluidic and/or thermal communication with coolant source 136 and a cabin and/or cargo-space of aircraft when connector 100 is connected to port 112. In some cases, a plurality of cooling channels 128, coolant sources 132, and/or connectors may be used to connect to multiple components of an electric vehicle. In some cases, coolant source 136 may provide conditioned air in order to control an environmental temperature within an electric vehicle, such as an aircraft, for example without limitation for cargo, passengers, and/or crew. In some cases, coolant source 136 may pre-condition at least a vehicle battery. As used in this disclosure, "pre-conditioning" is an act of affecting a characteristic of a battery, for example battery temperature, pressure, humidity, swell, and the like, substantially prior to charging. For example and without limitation, coolant source 136 may be configured to pre-condition at least a battery prior to charging, by providing a coolant flow to the at least a battery and raising and/or lowering temperature of the at least a battery. As a further non-limiting example, pre-conditioning may occur for a predetermined time prior to charging (e.g., 1 min, 10 min, 1 hour, 4 hours, and the like). Alternatively or additionally, pre-conditioning may be feedback controlled, by way of at least a battery sensor, and occur until or for a predetermined time after a certain condition has been met, such as without limitation when at least a battery is within a desired temperature range. In some cases, coolant source 136 may be configured to pre-condition any space or component within a vehicle, such as an aircraft, including without limitation cargo space and cabin. In some cases, and without limitation, coolant source 136 may provide cooling to at least a battery after charging the at least a battery. In some cases, and without limitation, at least a machine-learning process may be used to determine and/or optimize parameters associated with cooling at least a battery. In some non-limiting cases, controller 140 may use at least a machine-learning process to optimize cooling time relative of current charging metrics, for example charging battery parameters and/or sensor signals. Coolant source 136 may include any computing device described in this disclosure. Coolant source 136 and controller 140 may utilize any machine-learning process described in this disclosure.

With continued reference to FIG. 1B, controller 140 may be configured to control one or more electrical charging current within conductor 108 and coolant flow within cooling channel 124. As used in this disclosure, a "controller" is a logic circuit, such as an application-specific integrated circuit (ASIC), FPGA, microcontroller, and/or computing device that is configured to control a subsystem. For example, controller 140 may be configured to control one or more of coolant source 136 and/or charging battery. In some embodiments controller may control coolant source 136 and/or charging battery according to a control signal. As used in this disclosure, "control signal" is any transmission from controller to a subsystem that may affect performance of subsystem. In some embodiments, control signal may be analog. In some cases, control signal may be digital. Control signal may be communicated according to one or more communication protocols, for example without limitation Ethernet, universal asynchronous receiver-transmitter, and the like. In some cases, control signal may be a serial signal. In some cases, control signal may be a parallel signal. Control signal may be communicated by way of a network, for example a controller area network (CAN). In some cases, control signal may include commands to operate one or more of coolant source 136 and/or charging battery. For example, in some cases, coolant source 136 may include a valve to control coolant flow and controller 140 may be configured to control the valve by way of control signal. In some cases, coolant source 136 may include a flow source (e.g., a pump, a fan, or the like) and controller 140 may be configured to control the flow source by way of control signal. In some cases, coolant source 136 may be configured to control a temperature of coolant and controller 140 may be configured to control a coolant temperature setpoint or range by way of control signal. In some cases, charging battery may include one or electrical components configured to control flow of an electric recharging current or switches, relays, direct current to direct current (DC-DC) converters, and the like. In some case, charging battery may include one or more circuits configured to provide a variable current source to provide electric recharging current, for example an active current source. Non-limiting examples of active current sources include active current sources without negative feedback, such as current-stable nonlinear implementation circuits, following voltage implementation circuits, voltage compensation implementation circuits, and current compensation implementation circuits, and current sources with negative feedback, including simple transistor current sources, such as constant currant diodes, Zener diode current source circuits, LED current source circuits, transistor current, and the like, Op-amp current source circuits, voltage regulator circuits, and curpistor tubes, to name a few. In some cases, one or more circuits within charging battery or within communication with charging battery are configured to affect electrical recharging current according to control signal from controller 140, such that the controller 140 may control at least a parameter of the electrical charging current. For example, in some cases, controller 140 may control one or more of current (Amps), potential (Volts), and/or power (Watts) of electrical charging current by way of control signal. In some cases, controller 140 may be configured to selectively engage electrical charging current, for example ON or OFF by way of control signal.

With continued reference to FIG. 1B, connector 100 may be configured such that one or more conductors 108 and cooling channel 120 make a connection with mating component 128 of electric vehicle port when the connector 100 is mated with electric vehicle port. As used in this disclosure, a "mating component" is a component that is configured to mate with at least another component, for example in a certain (i.e. mated) configuration.

With continued reference to FIG. 1B, a conductor 108 may include a proximity signal conductor. As used in this disclosure, an "proximity signal conductor" is a conductor configured to carry a proximity signal. As used in this disclosure, a "proximity signal" is a signal that is indicative of information about a location of connector. Proximity signal may be indicative of attachment of connector with a port, for instance electric vehicle port and/or test port. In some cases, a proximity signal may include an analog signal, a digital signal, an electrical signal, an optical signal, a fluidic signal, or the like. In some cases, a proximity signal conductor may be configured to conduct a proximity signal indicative of attachment between connector 100 and a port, for example electric vehicle port.

Still referring to FIG. 1B, in some cases, connector 100 may additionally include a proximity sensor. For example, and without limitation, sensor 144 may include a proximity sensor. Proximity sensor may be electrically communicative with a proximity signal conductor. Proximity sensor may be configured to generate a proximity signal as a function of connection between connector 100 and a port, for example port of electric aircraft. As used in this disclosure, a "sensor" is a device that is configured to detect a phenomenon and transmit information related to the detection of the phenomenon. For example, in some cases a sensor may transduce a detected phenomenon, such as without limitation temperature, pressure, and the like, into a sensed signal. As used in this disclosure, a "proximity sensor" is a sensor that is configured to detect at least a phenomenon related to connecter being mated to a port. Proximity sensor may include any sensor described in this disclosure, including without limitation a switch, a capacitive sensor, a capacitive displacement sensor, a doppler effect sensor, an inductive sensor, a magnetic sensor, an optical sensor (such as without limitation a photoelectric sensor, a photocell, a laser rangefinder, a passive charge-coupled device, a passive thermal infrared sensor, and the like), a radar sensor, a reflection sensor, a sonar sensor, an ultrasonic sensor, fiber optics sensor, a Hall effect sensor, and the like.

Still referring to FIG. 1B, in some embodiments, connector 100 may additionally include an isolation monitor conductor configured to conduct an isolation monitoring signal. In some cases, power systems for example charging battery or electric aircraft batteries must remain electrically isolated from communication, control, and/or sensor signals. As used in this disclosure, "isolation" is a state where substantially no communication of a certain type is possible between two components, for example electrical isolation refers to elements which are not in electrical communication. Often signal carrying conductors and components (e.g., sensors) may need to be in relatively close proximity with power systems and/or power carrying conductors. For instance, battery sensors which sense characteristics of batteries, for example batteries within an electric vehicle, are often by virtue of their function placed in close proximity with a battery. A battery sensor that measures battery charge and communicates a signal associated with battery charge back to controller 140 is at risk of becoming unisolated from the battery. In some cases, an isolation monitoring signal will indicate isolation of one or more components. In some cases, an isolation monitoring signal may be generated by an isolation monitoring sensor. Isolation monitoring sensor may include any sensor described in this disclosure, such as without limitation a multi-meter, an impedance meter, and/or a continuity meter. In some cases, isolation from an electrical power (e.g., battery and/or charging battery) may be required for housing of connector 100 and a ground. Isolation monitoring signal may, in some cases, communication information about isolation between an electrical power and ground, for example along a flow path that includes connector 100.

Still referring to FIG. 1B, in some embodiments, connector 100 may additionally include a cooling channel 120 being located proximal or otherwise in thermal communication with one or more conductors 120, for example direct current conductor and/or alternating current conductor. In some cases, heat generated within one or more conductors 108 may be transferred into coolant within cooling channel 120. In some cases, cooling channel 120 may be arranged substantially coaxial with one or more conductors 120, such that coolant flows substantially parallel with an axis of the one or more conductors 120. Alternatively or additionally, in some cases, cooling channel 120 may be arranged in cross flow with one or more conductors 120. In some cases, connector 100 may include a heat exchanged configured to extract heat from one or more conductors 120, for example at a location of high current and/or high impedance (e.g., resistance) within conductor. In some cases, generated heat within a conductor 108 may be proportional to current within conductor squared. Heating within a conductor 108 may be understood according to Joule heating, also referred to in this disclosure as resistive, resistance, or Ohmic heating. Joule-Lenz law states that power of heat generated by a conductor 108 is proportional to a product of conductor 108 resistance and a square of current within the conductor 108, see below.

$$P \propto I^2 R$$

where P is power of heat generated, for example in Watts, I is electric current within conductor 108, for example in Amps, and R is resistance of conductor 108, for example in Ohms. In some cases, coolant flow may be configured to provide a cooling load that is sufficient to cool at least a conductor 108 and one or more electric vehicle batteries during charging.

Still referring to FIGS. 1A AND 1B, in some embodiments, one or more of at least a direct current conductor and at least an alternating current conductor may be further configured to conduct a communication signal and/or control signal by way of power line communication. In some cases, controller 140 may be configured within communication of communication signal, for example by way of a power line communication modem. As used in this disclosure, "power line communication" is process of communicating at least a communication signal simultaneously with electrical power transmission. In some cases, power line communication may operate by adding a modulated carrier signal (e.g., communication signal) to a power conductor 108. Different types of power-line communications use different frequency bands. In some case, alternating current may have a frequency of about 50 or about 60 Hz. In some cases, power conductor 108 may be shielded in order to prevent emissions of power line communication modulation frequencies. Alternatively or additionally, power line communication modulation frequency may be within a range unregulated by radio regulators, for example below about 500 KHz.

Still referring to FIG. 1B, in some embodiments, housing of connector 100 may be configured to mate with a test port. For example, test port may be identical to electric aircraft port. As used in this disclosure, a "test port" is port located outside of an electric vehicle that mates with connector. In some cases, test port may close a circuit with one or more conductors or flow paths within connector and thereby allow for said one more conductors or flow paths to be tested, for example for continuity, impedance, resistance, and the like. In some cases, test port may be configured to test functionality of one or more of the at least a direct current conductor, the at least an alternating current conductor, the at least a control signal conductor, the at least a ground conductor, the at least a cooling channel, and the at least a proximity conductor. Test port may facilitate one or more signals, for example feedback signals, to be communicated with controller 140 as a function of connector 100 being attached with test port. In some cases, test port may allow for verification that performance of connector 100 is within specified limits. As used in this disclosure, "verification" is a process of ensuring that which is being "verified" complies with certain constraints, for example without limitation system requirements, regulations, and the like. In some cases, verification may include comparing a product, such as without limitation charging or cooling performance metrics, against one or more acceptance criteria. For example, in some cases, charging or cooling performance metrics, may be required to function according to prescribed constraints or specification. Ensuring that charging or cooling performance metrics are in compliance with acceptance criteria may, in some cases, constitute verification. In some cases, verification may include ensuring that data (e.g., performance metric data) is complete, for example that all required data types, are present, readable, uncorrupted, and/or otherwise useful for controller 140. In some cases, some or all verification processes may be performed by controller 140. In some cases, at least a machine-learning process, for example a machine-learning model, may be used to verify. Controller 140 may use any machine-learning process described in this disclosure for this or any other function. In some embodiments, at least one of validation and/or verification includes without limitation one or more of supervisory validation, machine-learning processes, graph-based validation, geometry-based validation, and rules-based validation.

Figure 2:
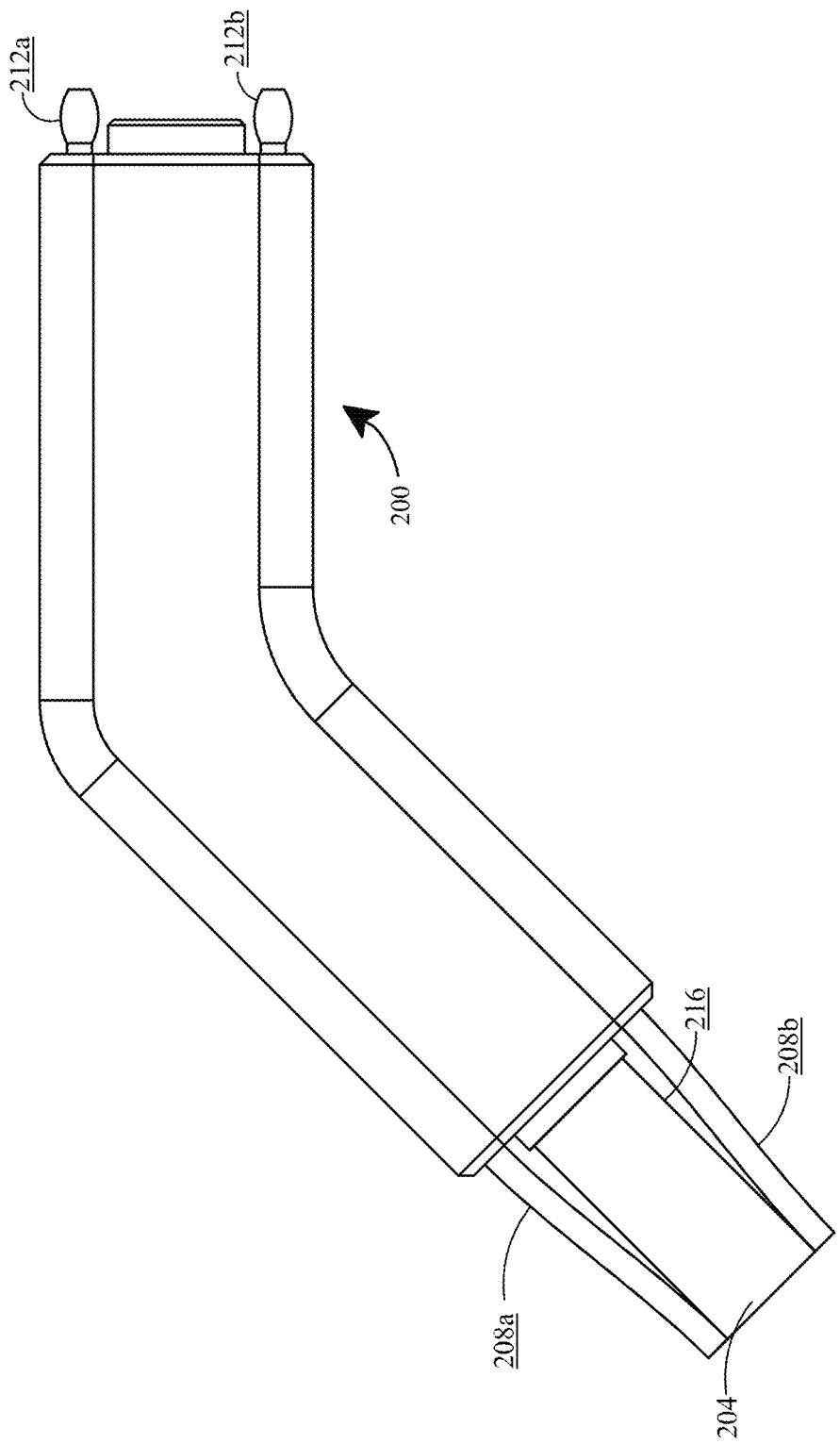
FIG. 2 illustrates an exemplary schematic of an exemplary connector for charging an electric vehicle in accordance with one or more embodiments of the present disclosure.

Referring now to FIG. 2, an exemplary connector 200 is schematically illustrated. Connector 200 is illustrated with a tether 204. Tether 204 may include one or more conductors and/or cooling channels. Tether 204 may include a conduit, for instance a jacket, enshrouding one or more conductors and/or cooling channels. In some cases, conduit may be flexible, electrically insulating, and/or fluidically sealed. As shown in FIG. 2, exemplary connector 200 is shown with a first power conductor and a second power conductor. As used in this disclosure, a "power conductor" is a conductor configured to conduct an electrical charging current, for example a direct current and/or an alternating current. In some cases, a conductor may include a cable and a contact. A cable may include any electrically conductive material including without limitation copper and/or copper alloys. As used in this disclosure, a "contact" is an electrically conductive component that is configured to make physical contact with a mating electrically conductive component, thereby facilitating electrical communication between the contact and the mating component. In some cases, a contact may be configured to provide electrical communication with a mating component within a port. In some cases, a contact may contain copper and/or copper-alloy. In some cases, contact may include a coating. A contact coating may include without limitation hard gold, hard gold flashed palladium-nickel (e.g., 80/20), tin, silver, diamond-like carbon, and the like.

With continued reference to FIG. 2, a first conductor may include a first cable 208a and a first contact 212a in electrical communication with the first cable. Likewise, a second conductor may include a second cable 208b and a second contact 212b in electrical communication with the second cable. In some cases, connector 200 may also include a cooling channel 216. In some cases, connector 200 may include a plurality of cooling channels for example a coolant supply and a coolant return. Alternatively, in some cases, connector 200 may include one cooling channel 216, for example without limitation when coolant supplied is a gas or is not returned to coolant source. In some cases, cooling channel 216 may be located in thermal communication with a cable 208a-b, thereby allowing coolant to cool the cable 208a-b. In some cases, cooling channel 216 may be located within thermal communication with a contact 212a-b, thereby allowing coolant to cool the contacts 212a-b.

Figure 3:
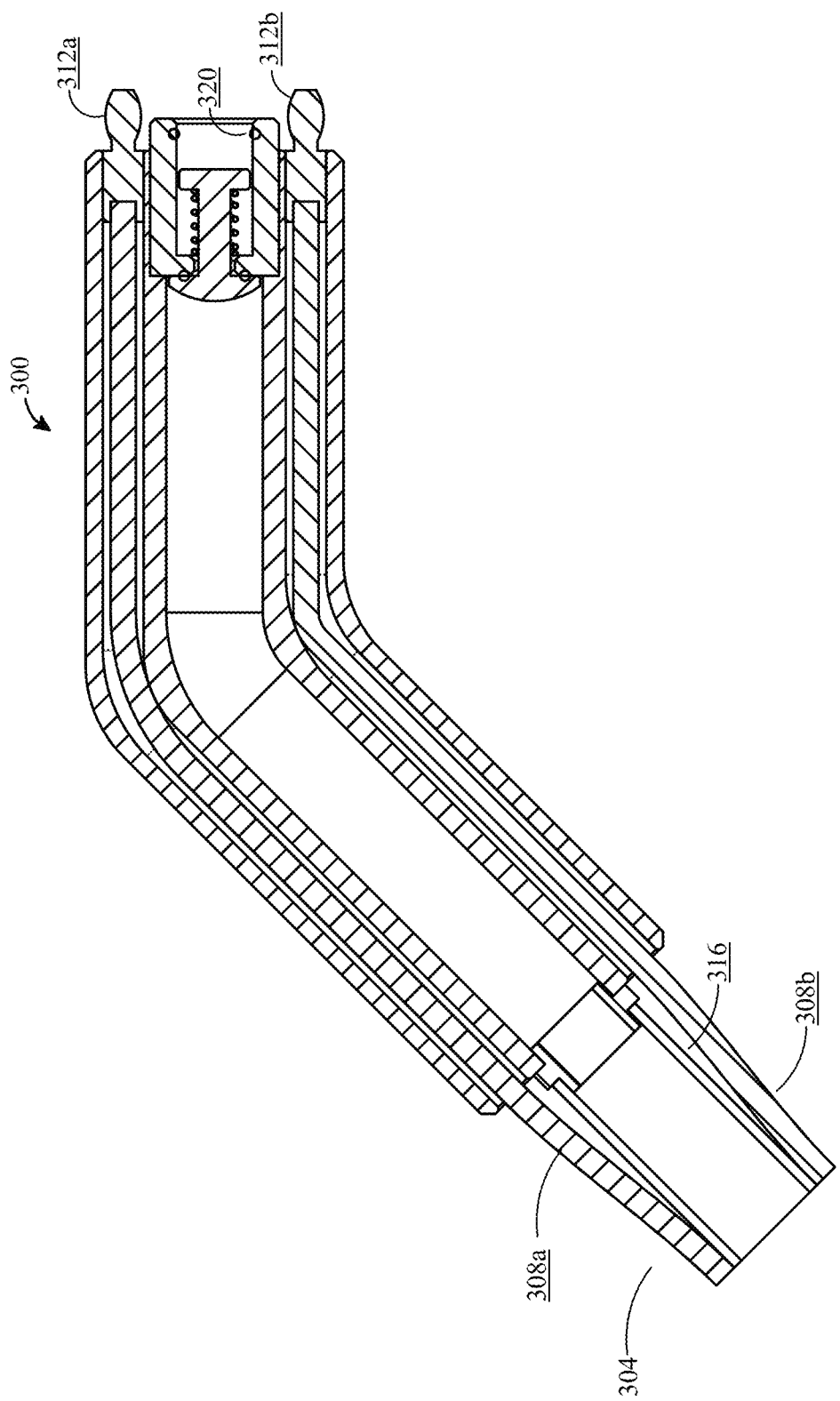
FIG. 3 is a cross-sectional view of an exemplary schematic of an exemplary connector for charging an electric vehicle in accordance with one or more embodiments of the present disclosure.

Referring now to FIG. 3, an exemplary cross-sectional view of an exemplary connector 300 is illustrated. Connector 300 is illustrated with a tether 304. Tether 304 may include one or more conductors and/or cooling channels. Connector 300 is shown with a first power conductor and a second power conductor. A first conductor may include a first cable 308a and a first contact 312a in electrical communication with the first cable. Likewise, a second conductor may include a second cable 308b and a second contact 312b in electrical communication with the second cable. Connector 300 may also include a cooling channel 316.

As shown in FIG. 3, in some cases, cooling channel 316 may be configured to mate with a port. For example, cooling channel 316 may include a fitting within connector 300. In some cases, fitting may include one or more seals 320. Seals may include any seal described in this disclosure and may be configured to seal a joint between cooling channel 316 and a mating component (e.g., fitting and/or additionally cooling channel) within port, when connector is attached to the port. As used in this disclosure, a "seal" is a component that is substantially impermeable to a substance (e.g., coolant, air, and/or water) and is designed and/or configured to prevent flow of that substance at a certain location, e.g., joint. Seal may be configured to seal coolant. In some cases, seal may include at least one of a gasket, an O-ring, a mechanical fit (e.g., press fit or interference fit), and the like. In some cases, seal may include an elastomeric material, for example without limitation silicone, buna-N, fluoroelastomer, fluorosilicone, polytetrafluoroethylene, polyethylene, polyurethane, rubber, ethylene propylene diene monomer, and the like. In some cases, seal may include a compliant element, such as without limitation a spring or elastomeric material, to ensure positive contact of seal with a sealing face. In some cases, seal may include a piston seal and/or a face seal. As used in this disclosure, a "joint" is a transition region between two components. For example in some cases, a cooling channel may have a joint located between connector and electric vehicle port.

With continued reference to FIG. 3, in some embodiments, cooling channel 316 may include a valve 324. Valve 324 may include any type of valve, for example a mechanical valve, an electrical valve, a check valve, or the like. In some cases, valve 324 may include quick disconnect. In some cases, valve 324 may include a normally-closed vale, for example a mushroom-poppet style valve, as shown in FIG. 3. Additional non-limiting examples of normally-closed valves include solenoid valves, a spring-loaded valve, and the like. In some cases, a valve may include one or more of a ball valve, a butterfly valve, a body valve, a bonnet valve, a port valve, an actuator valve, a disc valve, a seat valve, a stem valve, a gasket valve, a trim valve, or the like. In some cases, valve 324 may be configured to open when connector is attached to port and/or when cooling channel 316, in particular, is mated with a mating component within port. In some cases, valve 324 may be automatically opened/closed, for example by a controller 140. As described in more detail below, in some exemplary embodiments, mating of certain components within connector and port occur in prescribed sequence. For example, in some cases, cooling channel 316 may first be mated and sealed to its mating component within a port, before a valve 324 is opened and/or one or more conductors 312a-b are mated to their respective mating components within the port. In some cases, valve 324 may be configured not to open until after connection of one or more conductors 312a-b. In some embodiments, connector 300 may provide coolant by way of cooling channel 316 to port. Alternatively or additionally, in some embodiments, connector may include a cooling channel which is substantially closed and configured to cool one or more conductors.

Figure 4:
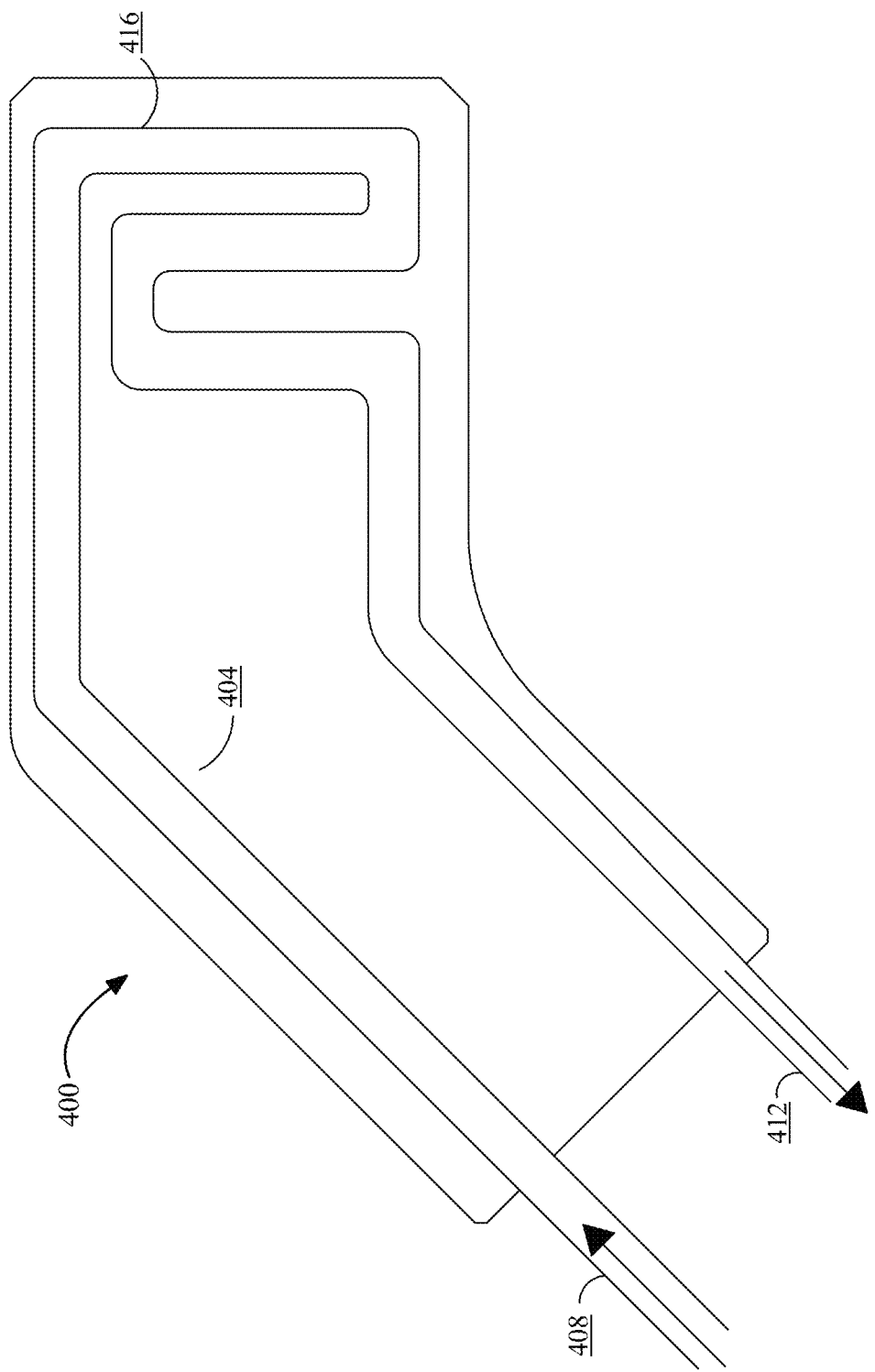
FIG. 4 illustrates an exemplary cooling channel within an exemplary connector in accordance with one or more embodiments of the present disclosure.

Referring now to FIG. 4, an exemplary connector 400 is shown. In some embodiments, connector 400 may include a cooling channel 404. In some cases, cooling channel 404 may be substantially sealed within connector 400. For example, in some cases, a coolant flow 404 path may not be mated to a mating component, such as a fluidic fitting or flow path, when connecter 400 is attached to a port. In some cases, a cooling channel 404 within connector 400 may include a coolant supply 408, a coolant return 412, and/or a heat exchanger 416. In some cases, coolant supply 408 is configured to contain and direct a flow of coolant substantially toward and within connector 400; coolant return is configured to contain and direct the flow of coolant substantially away from connector 400; and heat exchanger 416 is configured to transfer heat from at least a portion (or component of connector) into the flow of coolant. In some cases, heat exchanger 416 may be located proximal and/or within thermal conductivity of at least one conductor, cable, and/or contact, for example a power conductor. As described above, connector 400 may include one or more temperature sensors configured to detect a temperature and transmit a signal representative of that temperature, for example to a controller 140. In some cases, at least a temperature sensor may be located within thermal communication of one or more of a conductor, a cable, and/or a contact and controller 140 may control one or more aspects of a flow of coolant and/or electrical charging current as a function of the detected temperature. In some cases, connector 400 may include a plurality of cooling channels, for example a first cooling channel 404 that is substantially sealed and a second cooling channel 316 that is configured to be in fluidic communication with a mating component when connector 400 is attached to a port. In some cases, a first cooling channel 404 may be in thermal communication, for example by way of a heat exchanger, with a second cooling channel 316, such that coolant of the second cooling channel 316 may be cooled by coolant of the first cooling channel 404.

Figure 5:
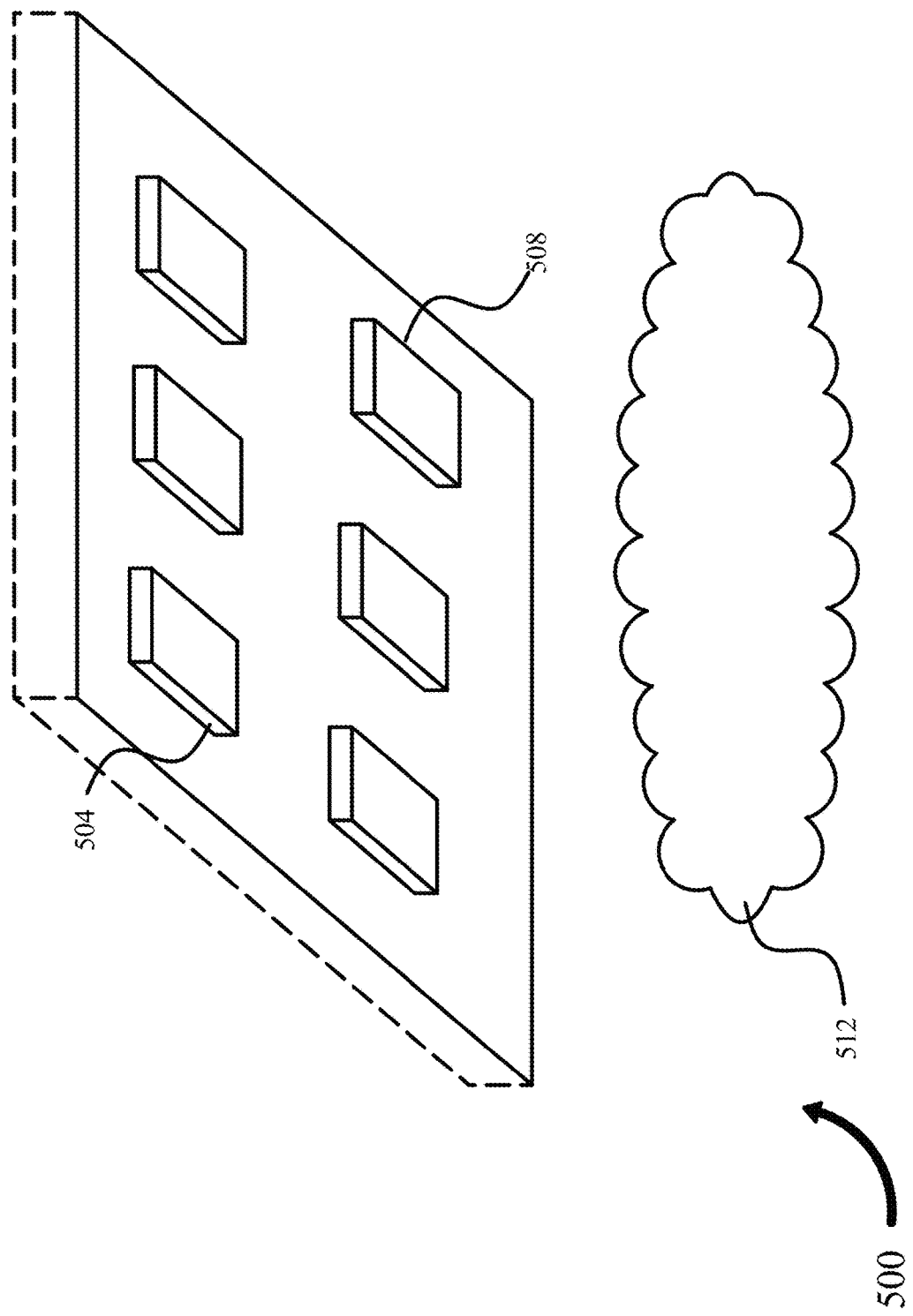
FIG. 5 is a block diagram illustrating an exemplary sensor suite in accordance with one or more embodiments of the present disclosure.

Referring now to FIG. 5, an embodiment of sensor suite 500 is presented. The herein disclosed system and method may comprise a plurality of sensors in the form of individual sensors or a sensor suite working in tandem or individually. In some cases, sensor suite 500 may communicate by way of at least a conductor, such as within limitation a control signal conductor. Alternatively and/or additionally, in some cases, sensor suite 500 may be communicative by at least a network, for example any network described in this disclosure including wireless (Wi-Fi), controller area network (CAN), the Internet, and the like. A sensor suite may include a plurality of independent sensors, as described herein, where any number of the described sensors may be used to detect any number of physical or electrical quantities associated with a vehicle battery or an electrical energy storage system, such as without limitation charging battery. Independent sensors may include separate sensors measuring physical or electrical quantities that may be powered by and/or in communication with circuits independently, where each may signal sensor output to a control circuit such as a user graphical interface. In a non-limiting example, there may be four independent sensors housed in and/or on battery pack measuring temperature, electrical characteristic such as voltage, amperage, resistance, or impedance, or any other parameters and/or quantities as described in this disclosure. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability of controller 140 and/or user to detect phenomenon is maintained.

With continued reference to FIG. 5, sensor suite 500 may include a humidity sensor 504. Humidity, as used in this disclosure, is the property of a gaseous medium (almost always air) to hold water in the form of vapor. An amount of water vapor contained within a parcel of air can vary significantly. Water vapor is generally invisible to the human eye and may be damaging to electrical components. There are three primary measurements of humidity, absolute, relative, specific humidity. "Absolute humidity," for the purposes of this disclosure, describes the water content of air and is expressed in either grams per cubic meters or grams per kilogram. "Relative humidity", for the purposes of this disclosure, is expressed as a percentage, indicating a present stat of absolute humidity relative to a maximum humidity given the same temperature. "Specific humidity", for the purposes of this disclosure, is the ratio of water vapor mass to total moist air parcel mass, where parcel is a given portion of a gaseous medium. Humidity sensor 504 may be psychrometer. Humidity sensor 504 may be a hygrometer. Humidity sensor 504 may be configured to act as or include a humidistat. A "humidistat", for the purposes of this disclosure, is a humidity-triggered switch, often used to control another electronic device. Humidity sensor 504 may use capacitance to measure relative humidity and include in itself, or as an external component, include a device to convert relative humidity measurements to absolute humidity measurements. "Capacitance", for the purposes of this disclosure, is the ability of a system to store an electric charge, in this case the system is a parcel of air which may be near, adjacent to, or above a battery cell.

With continued reference to FIG. 5, sensor suite 500 may include multimeter 508. Multimeter 508 may be configured to measure voltage across a component, electrical current through a component, and resistance of a component. Multimeter 508 may include separate sensors to measure each of the previously disclosed electrical characteristics such as voltmeter, ammeter, and ohmmeter, respectively.

Alternatively or additionally, and with continued reference to FIG. 5, sensor suite 500 may include a sensor or plurality thereof that may detect voltage and direct charging of individual battery cells according to charge level; detection may be performed using any suitable component, set of components, and/or mechanism for direct or indirect measurement and/or detection of voltage levels, including without limitation comparators, analog to digital converters, any form of voltmeter, or the like. Sensor suite 500 and/or a control circuit incorporated therein and/or communicatively connected thereto may be configured to adjust charge to one or more battery cells as a function of a charge level and/or a detected parameter. For instance, and without limitation, sensor suite 500 may be configured to determine that a charge level of a battery cell is high based on a detected voltage level of that battery cell or portion of the battery pack. Sensor suite 500 may alternatively or additionally detect a charge reduction event, defined for purposes of this disclosure as any temporary or permanent state of a battery cell requiring reduction or cessation of charging; a charge reduction event may include a cell being fully charged and/or a cell undergoing a physical and/or electrical process that makes continued charging at a current voltage and/or current level inadvisable due to a risk that the cell will be damaged, will overheat, or the like. Detection of a charge reduction event may include detection of a temperature, of the cell above a threshold level, detection of a voltage and/or resistance level above or below a threshold, or the like. Sensor suite 500 may include digital sensors, analog sensors, or a combination thereof. Sensor suite 500 may include digital-to-analog converters (DAC), analog-to-digital converters (ADC, A/D, A-to-D), a combination thereof, or other signal conditioning components used in transmission of a battery sensor signal to a destination over wireless or wired connection.

With continued reference to FIG. 5, sensor suite 500 may include thermocouples, thermistors, thermometers, passive infrared sensors, resistance temperature sensors (RTD's), semiconductor based integrated circuits (IC), a combination thereof or another undisclosed sensor type, alone or in combination. Temperature, for the purposes of this disclosure, and as would be appreciated by someone of ordinary skill in the art, is a measure of the heat energy of a system. Temperature, as measured by any number or combinations of sensors present within sensor suite 500, may be measured in Fahrenheit (° F.), Celsius (° C.), Kelvin (° K), or another scale alone or in combination. The temperature measured by sensors may comprise electrical signals which are transmitted to their appropriate destination wireless or through a wired connection.

With continued reference to FIG. 5, sensor suite 500 may include a sensor configured to detect gas that may be emitted during or after a catastrophic cell failure. "Catastrophic cell failure", for the purposes of this disclosure, refers to a malfunction of a battery cell, which may be an electrochemical cell, that renders the cell inoperable for its designed function, namely providing electrical energy to at least a portion of an electric aircraft. Byproducts of catastrophic cell failure 512 may include gaseous discharge including oxygen, hydrogen, carbon dioxide, methane, carbon monoxide, a combination thereof, or another undisclosed gas, alone or in combination. Further the sensor configured to detect vent gas from electrochemical cells may comprise a gas detector. For the purposes of this disclosure, a "gas detector" is a device used to detect a gas is present in an area. Gas detectors, and more specifically, the gas sensor that may be used in sensor suite 500, may be configured to detect combustible, flammable, toxic, oxygen depleted, a combination thereof, or another type of gas alone or in combination. The gas sensor that may be present in sensor suite 500 may include a combustible gas, photoionization detectors, electrochemical gas sensors, ultrasonic sensors, metal-oxide-semiconductor (MOS) sensors, infrared imaging sensors, a combination thereof, or another undisclosed type of gas sensor alone or in combination. Sensor suite 500 may include sensors that are configured to detect non-gaseous byproducts of catastrophic cell failure 512 including, in non-limiting examples, liquid chemical leaks including aqueous alkaline solution, ionomer, molten phosphoric acid, liquid electrolytes with redox shuttle and ionomer, and salt water, among others. Sensor suite 500 may include sensors that are configured to detect non-gaseous byproducts of catastrophic cell failure 512 including, in non-limiting examples, electrical anomalies as detected by any of the previous disclosed sensors or components.

With continued reference to FIG. 5, sensor suite 500 may be configured to detect events where voltage nears an upper voltage threshold or lower voltage threshold. The upper voltage threshold may be stored in data storage system for comparison with an instant measurement taken by any combination of sensors present within sensor suite 500. The upper voltage threshold may be calculated and calibrated based on factors relating to battery cell health, maintenance history, location within battery pack, designed application, and type, among others. Sensor suite 500 may measure voltage at an instant, over a period of time, or periodically. Sensor suite 500 may be configured to operate at any of these detection modes, switch between modes, or simultaneous measure in more than one mode. Controller 140 may detect through sensor suite 500 events where voltage nears the lower voltage threshold. The lower voltage threshold may indicate power loss to or from an individual battery cell or portion of the battery pack. Controller 140 may detect through sensor suite 500 events where voltage exceeds the upper and lower voltage threshold. Events where voltage exceeds the upper and lower voltage threshold may indicate battery cell failure or electrical anomalies that could lead to potentially dangerous situations for aircraft and personnel that may be present in or near its operation.

With continued reference to FIG. 5, in some cases, sensor suite 500 may include a swell sensor configured to sense swell, pressure, or strain of at least a battery cell. In some cases, battery cell swell, pressure, and/or strain may be indicative of an amount of gases and/or gas expansion within a battery cell. Battery swell sensor may include one or more of a pressure sensor, a load cell, and a strain gauge. In some cases, battery swell sensor may output a battery swell signal that is analog and requires signal processing techniques. For example, in some cases, wherein battery swell sensor includes at least a strain gauge, battery swell signal may be processed and digitized by one or more of a Wheatstone bridge, an amplifier, a filter, and an analog to digital converter. In some cases, battery sensor signal may include battery swell signal.

Figure 6:
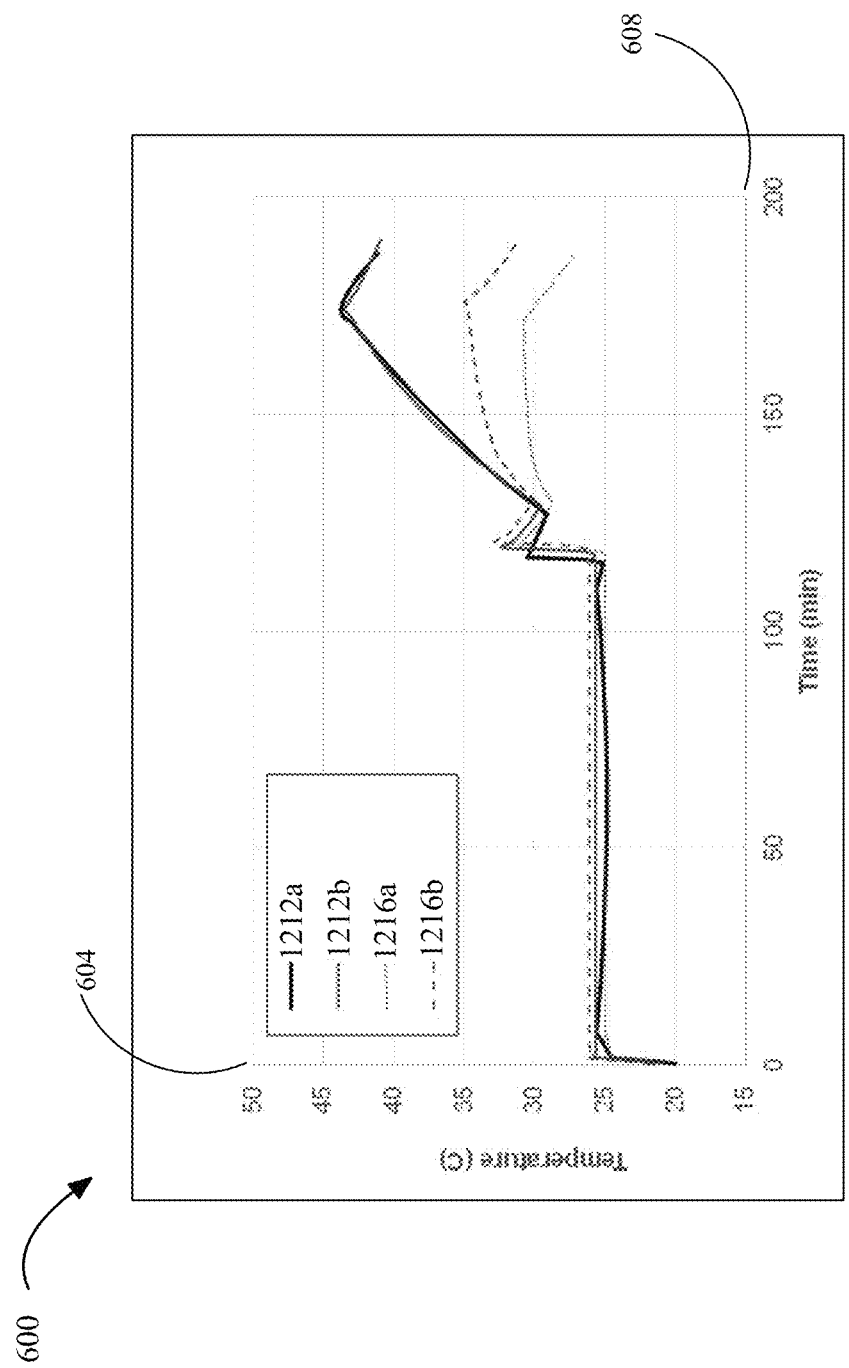
FIG. 6 is a graph that depicts exemplary battery temperature during recharge under a number of exemplary conditions in accordance with one or more embodiments of the present disclosure.

Referring now to FIG. 6, a graph 600 is depicted that illustrated exemplary vehicle battery temperature during exemplary recharging processes. Graph 600 illustrates battery temperature along a vertical axis 604, in degrees Celsius. Graph 600 illustrates time along a horizontal axis 608, in minutes. Graph 600 illustrates battery temperature during recharge for a vehicle battery in four different tests. During all four recharging processes ambient air temperature was approximately 20° C. and recharging was performed for about 1 hour (from time equals approximately 60 min to time equals approximately 180 min). Prior to recharging in each case, vehicle battery was used to take-off, fly approximately 200 nm, land, and cool (from time equals zero to time equals approximately 60 min). Recharge during each case was brought vehicle battery from approximately a 25% state of charge to approximately a 98% state of charge. A first and second baseline recharge 612a-b are illustrated on graph in by way of solid lines. It can be seen from graph 600, that first baseline 612a and second baseline 612b overlap very closely with one another. Both first and second baseline 612a-b were performed without cooling. Graph 600 illustrates two recharging conditions that included active cooling 616a-b by way of dashed lines. During active cooling, for the tests depicted in graph 600, coolant was air having a temperature approximately equal to that of ambient. First active cooling 616a, indicated on graph 600 by way of smaller dashed line, was performed with coolant flow of approximately 1 standard cubic foot per minute (SCFM). Second active cooling 616b, indicated on graph 600 by way of larger dashed line, was performed with coolant flow of approximately 0.5 standard cubic feet per minute (SCFM).

Figure 7:
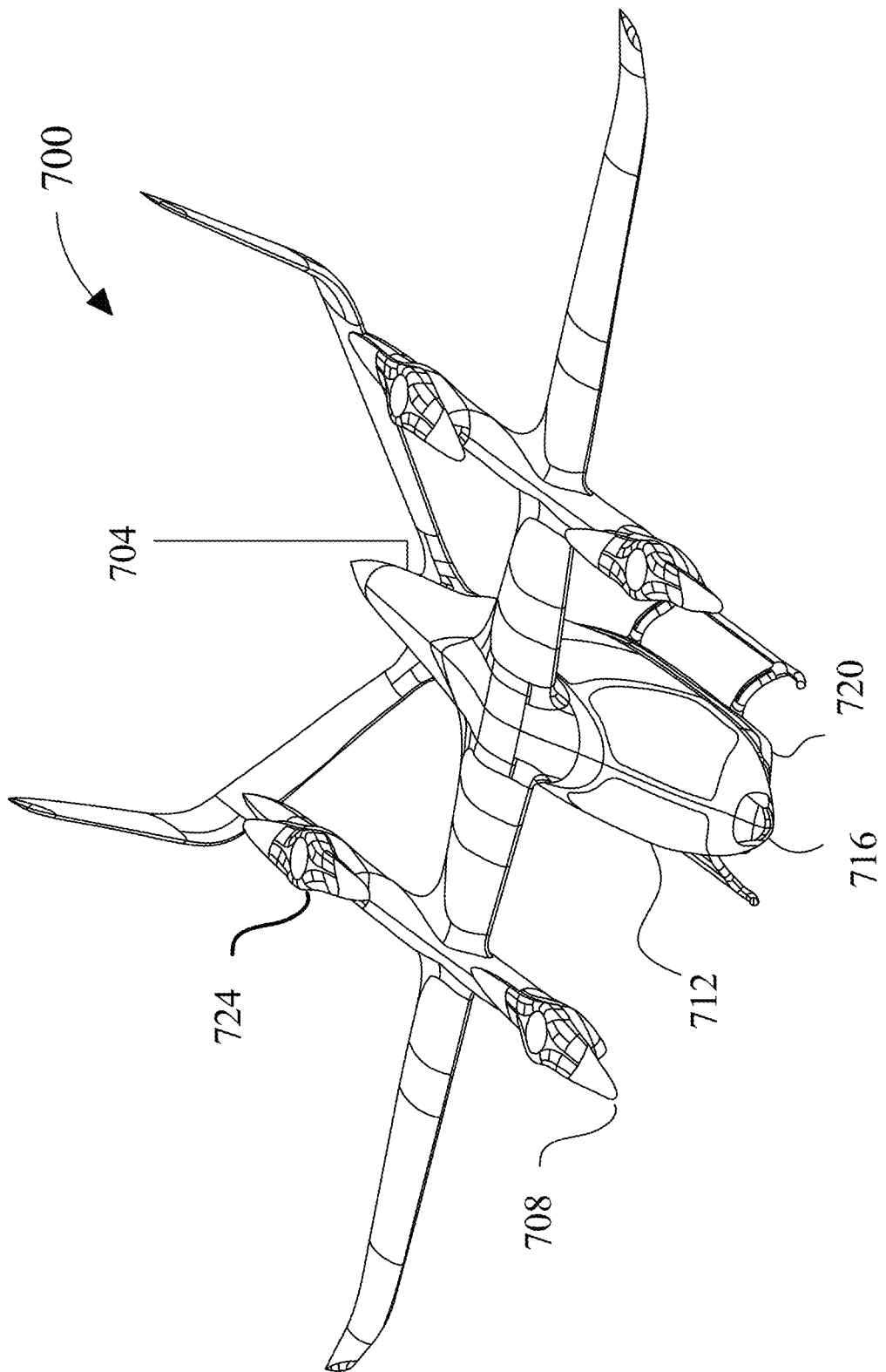
FIG. 7 is a schematic of an exemplary electric aircraft in accordance with one or more embodiments of the present disclosure.

Referring now to FIG. 7, an exemplary embodiment of an aircraft 700 is illustrated. Aircraft 700 may include an electrically powered aircraft (i.e., electric aircraft). In some embodiments, electrically powered aircraft may be an electric vertical takeoff and landing (eVTOL) aircraft. Electric aircraft may be capable of rotor-based cruising flight, rotor-based takeoff, rotor-based landing, fixed-wing cruising flight, airplane-style takeoff, airplane-style landing, and/or any combination thereof. "Rotor-based flight," as described in this disclosure, is where the aircraft generated lift and propulsion by way of one or more powered rotors coupled with an engine, such as a quadcopter, multi-rotor helicopter, or other vehicle that maintains its lift primarily using downward thrusting propulsors. "Fixed-wing flight," as described in this disclosure, is where the aircraft is capable of flight using wings and/or foils that generate lift caused by the aircraft's forward airspeed and the shape of the wings and/or foils, such as airplane-style flight.

Still referring to FIG. 7, aircraft 700 may include a fuselage 704. As used in this disclosure a "fuselage" is the main body of an aircraft, or in other words, the entirety of the aircraft except for the cockpit, nose, wings, empennage, nacelles, any and all control surfaces, and generally contains an aircraft's payload. Fuselage 704 may comprise structural elements that physically support the shape and structure of an aircraft. Structural elements may take a plurality of forms, alone or in combination with other types. Structural elements may vary depending on the construction type of aircraft and specifically, the fuselage. Fuselage 704 may comprise a truss structure. A truss structure may be used with a lightweight aircraft and may include welded aluminum tube trusses. A truss, as used herein, is an assembly of beams that create a rigid structure, often in combinations of triangles to create three-dimensional shapes. A truss structure may alternatively comprise titanium construction in place of aluminum tubes, or a combination thereof. In some embodiments, structural elements may comprise aluminum tubes and/or titanium beams. In an embodiment, and without limitation, structural elements may include an aircraft skin. Aircraft skin may be layered over the body shape constructed by trusses. Aircraft skin may comprise a plurality of materials such as aluminum, fiberglass, and/or carbon fiber, the latter of which will be addressed in greater detail later in this paper.

Still referring to FIG. 7, aircraft 700 may include a plurality of actuators 708. Actuator 708 may include any motor and/or propulsor. In an embodiment, actuator 708 may be mechanically coupled to an aircraft. As used herein, a person of ordinary skill in the art would understand "mechanically coupled" to mean that at least a portion of a device, component, or circuit is connected to at least a portion of the aircraft via a mechanical coupling. Said mechanical coupling can include, for example, rigid coupling, such as beam coupling, bellows coupling, bushed pin coupling, constant velocity, split-muff coupling, diaphragm coupling, disc coupling, donut coupling, elastic coupling, flexible coupling, fluid coupling, gear coupling, grid coupling, Hirth joints, hydrodynamic coupling, jaw coupling, magnetic coupling, Oldham coupling, sleeve coupling, tapered shaft lock, twin spring coupling, rag joint coupling, universal joints, or any combination thereof. As used in this disclosure an "aircraft" is vehicle that may fly. As a non-limiting example, aircraft may include airplanes, helicopters, airships, blimps, gliders, paramotors, and the like thereof. In an embodiment, mechanical coupling may be used to connect the ends of adjacent parts and/or objects of an electric aircraft. Further, in an embodiment, mechanical coupling may be used to join two pieces of rotating electric aircraft components.

With continued reference to FIG. 7, a plurality of actuators 708 may be configured to produce a torque. As used in this disclosure a "torque" is a measure of force that causes an object to rotate about an axis in a direction. For example, and without limitation, torque may rotate an aileron and/or rudder to generate a force that may adjust and/or affect altitude, airspeed velocity, groundspeed velocity, direction during flight, and/or thrust. For example, plurality of actuators 708 may include a component used to produce a torque that affects aircrafts' roll and pitch, such as without limitation one or more ailerons. An "aileron," as used in this disclosure, is a hinged surface which form part of the trailing edge of a wing in a fixed wing aircraft, and which may be moved via mechanical means such as without limitation servomotors, mechanical linkages, or the like. As a further example, plurality of actuators 708 may include a rudder, which may include, without limitation, a segmented rudder that produces a torque about a vertical axis. Additionally or alternatively, plurality of actuators 708 may include other flight control surfaces such as propulsors, rotating flight controls, or any other structural features which can adjust movement of aircraft 700. Plurality of actuators 708 may include one or more rotors, turbines, ducted fans, paddle wheels, and/or other components configured to propel a vehicle through a fluid medium including, but not limited to air.

Still referring to FIG. 7, plurality of actuators 708 may include at least a propulsor component. As used in this disclosure a "propulsor component" or "propulsor" is a component and/or device used to propel a craft by exerting force on a fluid medium, which may include a gaseous medium such as air or a liquid medium such as water. In an embodiment, when a propulsor twists and pulls air behind it, it may, at the same time, push an aircraft forward with an amount of force and/or thrust. More air pulled behind an aircraft results in greater thrust with which the aircraft is pushed forward. Propulsor component may include any device or component that consumes electrical power on demand to propel an electric aircraft in a direction or other vehicle while on ground or in-flight. In an embodiment, propulsor component may include a puller component. As used in this disclosure a "puller component" is a component that pulls and/or tows an aircraft through a medium. As a non-limiting example, puller component may include a flight component such as a puller propeller, a puller motor, a puller propulsor, and the like. Additionally, or alternatively, puller component may include a plurality of puller flight components. In another embodiment, propulsor component may include a pusher component. As used in this disclosure a "pusher component" is a component that pushes and/or thrusts an aircraft through a medium. As a non-limiting example, pusher component may include a pusher component such as a pusher propeller, a pusher motor, a pusher propulsor, and the like. Additionally, or alternatively, pusher flight component may include a plurality of pusher flight components.

In another embodiment, and still referring to FIG. 7, propulsor may include a propeller, a blade, or any combination of the two. A propeller may function to convert rotary motion from an engine or other power source into a swirling slipstream which may push the propeller forwards or backwards. Propulsor may include a rotating power-driven hub, to which several radial airfoil-section blades may be attached, such that an entire whole assembly rotates about a longitudinal axis. As a non-limiting example, blade pitch of propellers may be fixed at a fixed angle, manually variable to a few set positions, automatically variable (e.g. a "constant-speed" type), and/or any combination thereof as described further in this disclosure. As used in this disclosure a "fixed angle" is an angle that is secured and/or substantially unmovable from an attachment point. For example, and without limitation, a fixed angle may be an angle of 2.2° inward and/or 1.7° forward. As a further non-limiting example, a fixed angle may be an angle of 3.6° outward and/or 2.7° backward. In an embodiment, propellers for an aircraft may be designed to be fixed to their hub at an angle similar to the thread on a screw makes an angle to the shaft; this angle may be referred to as a pitch or pitch angle which may determine a speed of forward movement as the blade rotates. Additionally or alternatively, propulsor component may be configured having a variable pitch angle. As used in this disclosure a "variable pitch angle" is an angle that may be moved and/or rotated. For example, and without limitation, propulsor component may be angled at a first angle of 3.3° inward, wherein propulsor component may be rotated and/or shifted to a second angle of 1.7° outward.

Still referring to FIG. 7, propulsor may include a thrust element which may be integrated into the propulsor. Thrust element may include, without limitation, a device using moving or rotating foils, such as one or more rotors, an airscrew or propeller, a set of airscrews or propellers such as contra-rotating propellers, a moving or flapping wing, or the like. Further, a thrust element, for example, can include without limitation a marine propeller or screw, an impeller, a turbine, a pump-jet, a paddle or paddle-based device, or the like.

With continued reference to FIG. 7, plurality of actuators 708 may include power sources, control links to one or more elements, fuses, and/or mechanical couplings used to drive and/or control any other flight component. Plurality of actuators 708 may include a motor that operates to move one or more flight control components and/or one or more control surfaces, to drive one or more propulsors, or the like. A motor may be driven by direct current (DC) electric power and may include, without limitation, brushless DC electric motors, switched reluctance motors, induction motors, or any combination thereof. Alternatively or additionally, a motor may be driven by an inverter. A motor may also include electronic speed controllers, inverters, or other components for regulating motor speed, rotation direction, and/or dynamic braking.

Still referring to FIG. 7, plurality of actuators 708 may include an energy source. An energy source may include, for example, a generator, a photovoltaic device, a fuel cell such as a hydrogen fuel cell, direct methanol fuel cell, and/or solid oxide fuel cell, an electric energy storage device (e.g. a capacitor, an inductor, and/or a battery). An energy source may also include a battery cell, or a plurality of battery cells connected in series into a module and each module connected in series or in parallel with other modules. Configuration of an energy source containing connected modules may be designed to meet an energy or power requirement and may be designed to fit within a designated footprint in an electric aircraft in which system may be incorporated.

In an embodiment, and still referring to FIG. 7, an energy source may be used to provide a steady supply of electrical power to a load over a flight by an electric aircraft 700. For example, energy source may be capable of providing sufficient power for "cruising" and other relatively low-energy phases of flight. An energy source may also be capable of providing electrical power for some higher-power phases of flight as well, particularly when the energy source is at a high SOC, as may be the case for instance during takeoff. In an embodiment, energy source may include an emergency power unit which may be capable of providing sufficient electrical power for auxiliary loads including without limitation, lighting, navigation, communications, de-icing, steering or other systems requiring power or energy. Further, energy source may be capable of providing sufficient power for controlled descent and landing protocols, including, without limitation, hovering descent or runway landing. As used herein the energy source may have high power density where electrical power an energy source can usefully produce per unit of volume and/or mass is relatively high. As used in this disclosure, "electrical power" is a rate of electrical energy per unit time. An energy source may include a device for which power that may be produced per unit of volume and/or mass has been optimized, for instance at an expense of maximal total specific energy density or power capacity. Non-limiting examples of items that may be used as at least an energy source include batteries used for starting applications including Li ion batteries which may include NCA, NMC, Lithium iron phosphate (LiFePO4) and Lithium Manganese Oxide (LMO) batteries, which may be mixed with another cathode chemistry to provide more specific power if the application requires Li metal batteries, which have a lithium metal anode that provides high power on demand, Li ion batteries that have a silicon or titanite anode, energy source may be used, in an embodiment, to provide electrical power to an electric aircraft or drone, such as an electric aircraft vehicle, during moments requiring high rates of power output, including without limitation takeoff, landing, thermal de-icing and situations requiring greater power output for reasons of stability, such as high turbulence situations, as described in further detail below. A battery may include, without limitation a battery using nickel based chemistries such as nickel cadmium or nickel metal hydride, a battery using lithium ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), a battery using lithium polymer technology, lead-based batteries such as without limitation lead acid batteries, metal-air batteries, or any other suitable battery. Persons skilled in the art, upon reviewing the entirety of this disclosure, will be aware of various devices of components that may be used as an energy source.

Still referring to FIG. 7, an energy source may include a plurality of energy sources, referred to herein as a module of energy sources. Module may include batteries connected in parallel or in series or a plurality of modules connected either in series or in parallel designed to satisfy both power and energy requirements. Connecting batteries in series may increase a potential of at least an energy source which may provide more power on demand. High potential batteries may require cell matching when high peak load is needed. As more cells are connected in strings, there may exist a possibility of one cell failing which may increase resistance in module and reduce overall power output as voltage of the module may decrease as a result of that failing cell. Connecting batteries in parallel may increase total current capacity by decreasing total resistance, and it also may increase overall amp-hour capacity. Overall energy and power outputs of at least an energy source may be based on individual battery cell performance or an extrapolation based on a measurement of at least an electrical parameter. In an embodiment where energy source includes a plurality of battery cells, overall power output capacity may be dependent on electrical parameters of each individual cell. If one cell experiences high self-discharge during demand, power drawn from at least an energy source may be decreased to avoid damage to a weakest cell. Energy source may further include, without limitation, wiring, conduit, housing, cooling system and battery management system. Persons skilled in the art will be aware, after reviewing the entirety of this disclosure, of many different components of an energy source. Exemplary energy sources are disclosed in detail in U.S. patent application Ser. Nos. 16/948,157 and 16/048,140 both entitled "SYSTEM AND METHOD FOR HIGH ENERGY DENSITY BATTERY MODULE" by S. Donovan et al., which are incorporated in their entirety herein by reference.

Still referring to FIG. 7, according to some embodiments, an energy source may include an emergency power unit (EPU) (i.e., auxiliary power unit). As used in this disclosure an "emergency power unit" is an energy source as described herein that is configured to power an essential system for a critical function in an emergency, for instance without limitation when another energy source has failed, is depleted, or is otherwise unavailable. Exemplary non-limiting essential systems include navigation systems, such as MFD, GPS, VOR receiver or directional gyro, and other essential flight components, such as propulsors.

Still referring to FIG. 7, another exemplary actuator may include landing gear. Landing gear may be used for take-off and/or landing/Landing gear may be used to contact ground while aircraft 700 is not in flight. Exemplary landing gear is disclosed in detail in U.S. patent application Ser. No. 17/196,719 entitled "SYSTEM FOR ROLLING LANDING GEAR" by R. Griffin et al., which is incorporated in its entirety herein by reference.

Still referring to FIG. 7, aircraft 700 may include a pilot control 712, including without limitation, a hover control, a thrust control, an inceptor stick, a cyclic, and/or a collective control. As used in this disclosure a "collective control" or "collective" is a mechanical control of an aircraft that allows a pilot to adjust and/or control the pitch angle of the plurality of actuators 708. For example and without limitation, collective control may alter and/or adjust the pitch angle of all of the main rotor blades collectively. For example, and without limitation pilot control 712 may include a yoke control. As used in this disclosure a "yoke control" is a mechanical control of an aircraft to control the pitch and/or roll. For example and without limitation, yoke control may alter and/or adjust the roll angle of aircraft 700 as a function of controlling and/or maneuvering ailerons. In an embodiment, pilot control 712 may include one or more footbrakes, control sticks, pedals, throttle levels, and the like thereof. In another embodiment, and without limitation, pilot control 712 may be configured to control a principal axis of the aircraft. As used in this disclosure a "principal axis" is an axis in a body representing one three dimensional orientations. For example, and without limitation, principal axis or more yaw, pitch, and/or roll axis. Principal axis may include a yaw axis. As used in this disclosure a "yaw axis" is an axis that is directed towards the bottom of the aircraft, perpendicular to the wings. For example, and without limitation, a positive yawing motion may include adjusting and/or shifting the nose of aircraft 700 to the right. Principal axis may include a pitch axis. As used in this disclosure a "pitch axis" is an axis that is directed towards the right laterally extending wing of the aircraft. For example, and without limitation, a positive pitching motion may include adjusting and/or shifting the nose of aircraft 700 upwards. Principal axis may include a roll axis. As used in this disclosure a "roll axis" is an axis that is directed longitudinally towards the nose of the aircraft, parallel to the fuselage. For example, and without limitation, a positive rolling motion may include lifting the left and lowering the right wing concurrently.

Still referring to FIG. 7, pilot control 712 may be configured to modify a variable pitch angle. For example, and without limitation, pilot control 712 may adjust one or more angles of attack of a propeller. As used in this disclosure an "angle of attack" is an angle between the chord of the propeller and the relative wind. For example, and without limitation angle of attack may include a propeller blade angled 3.2°. In an embodiment, pilot control 712 may modify the variable pitch angle from a first angle of 2.71° to a second angle of 3.82°. Additionally or alternatively, pilot control 712 may be configured to translate a pilot desired torque for flight component 708. For example, and without limitation, pilot control 712 may translate that a pilot's desired torque for a propeller be 160 lb. ft. of torque. As a further non-limiting example, pilot control 712 may introduce a pilot's desired torque for a propulsor to be 290 lb. ft. of torque. Additional disclosure related to pilot control 712 may be found in U.S. patent application Ser. Nos. 17/001,845 and 16/929,206 both of which are entitled "A HOVER AND THRUST CONTROL ASSEMBLY FOR DUAL-MODE AIRCRAFT" by C. Spiegel et al., which are incorporated in their entirety herein by reference.

Still referring to FIG. 7, aircraft 700 may include a loading system. A loading system may include a system configured to load an aircraft of either cargo or personnel. For instance, some exemplary loading systems may include a swing nose, which is configured to swing the nose of aircraft 700 of the way thereby allowing direct access to a cargo bay located behind the nose. A notable exemplary swing nose aircraft is Boeing 747. Additional disclosure related to loading systems can be found in U.S. patent application Ser. No. 17/137,594 entitled "SYSTEM AND METHOD FOR LOADING AND SECURING PAYLOAD IN AN AIRCRAFT" by R. Griffin et al., entirety of which in incorporated herein by reference.

Still referring to FIG. 7, aircraft 700 may include a sensor 716. Sensor 716 may include any sensor or noise monitoring circuit described in this disclosure. Sensor 716 may be configured to sense a characteristic of pilot control 712. Sensor may be a device, module, and/or subsystem, utilizing any hardware, software, and/or any combination thereof to sense a characteristic and/or changes thereof, in an instant environment, for instance without limitation a pilot control 712, which the sensor is proximal to or otherwise in a sensed communication with, and transmit information associated with the characteristic, for instance without limitation digitized data. Sensor 716 may be mechanically and/or communicatively coupled to aircraft 700, including, for instance, to at least a pilot control 712. Sensor 716 may be configured to sense a characteristic associated with at least a pilot control 712 and/or controller 140. An environmental sensor may include without limitation one or more sensors used to detect ambient temperature, barometric pressure, and/or air velocity, one or more motion sensors which may include without limitation gyroscopes, accelerometers, inertial measurement unit (IMU), and/or magnetic sensors, one or more humidity sensors, one or more oxygen sensors, or the like. Additionally or alternatively, sensor 716 may include at least a geospatial sensor. Sensor 716 may be located inside an aircraft; and/or be included in and/or attached to at least a portion of the aircraft. Sensor may include one or more proximity sensors, displacement sensors, vibration sensors, and the like thereof. Sensor may be used to monitor the status of aircraft 700 for both critical and non-critical functions. Sensor may be incorporated into vehicle or aircraft or be remote.

Still referring to FIG. 7, in some embodiments, sensor 716 may be configured to sense a characteristic associated with any pilot control described in this disclosure. Non-limiting examples of a sensor 716 may include an inertial measurement unit (IMU), an accelerometer, a gyroscope, a proximity sensor, a pressure sensor, a light sensor, a pitot tube, an air speed sensor, a position sensor, a speed sensor, a switch, a thermometer, a strain gauge, an acoustic sensor, and an electrical sensor. In some cases, sensor 716 may sense a characteristic as an analog measurement, for instance, yielding a continuously variable electrical potential indicative of the sensed characteristic. In these cases, sensor 716 may additionally comprise an analog to digital converter (ADC) as well as any additionally circuitry, such as without limitation a Whetstone bridge, an amplifier, a filter, and the like. For instance, in some cases, sensor 716 may comprise a strain gage configured to determine loading of one or flight components, for instance landing gear. Strain gage may be included within a circuit comprising a Whetstone bridge, an amplified, and a bandpass filter to provide an analog strain measurement signal having a high signal to noise ratio, which characterizes strain on a landing gear member. An ADC may then digitize analog signal produces a digital signal that can then be transmitted other systems within aircraft 700, for instance without limitation a computing system, a pilot display, and a memory component. Alternatively or additionally, sensor 716 may sense a characteristic of a pilot control 712 digitally. For instance in some embodiments, sensor 716 may sense a characteristic through a digital means or digitize a sensed signal natively. In some cases, for example, sensor 716 may include a rotational encoder and be configured to sense a rotational position of a pilot control; in this case, the rotational encoder digitally may sense rotational "clicks" by any known method, such as without limitation magnetically, optically, and the like.

Still referring to FIG. 7, electric aircraft 700 may include at least a motor 724, which may be mounted on a structural feature of the aircraft. Design of motor 724 may enable it to be installed external to structural member (such as a boom, nacelle, or fuselage) for easy maintenance access and to minimize accessibility requirements for the structure; this may improve structural efficiency by requiring fewer large holes in the mounting area. In some embodiments, motor 724 may include two main holes in top and bottom of mounting area to access bearing cartridge. Further, a structural feature may include a component of electric aircraft 700. For example, and without limitation structural feature may be any portion of a vehicle incorporating motor 724, including any vehicle as described in this disclosure. As a further non-limiting example, a structural feature may include without limitation a wing, a spar, an outrigger, a fuselage, or any portion thereof; persons skilled in the art, upon reviewing the entirety of this disclosure, will be aware of many possible features that may function as at least a structural feature. At least a structural feature may be constructed of any suitable material or combination of materials, including without limitation metal such as aluminum, titanium, steel, or the like, polymer materials or composites, fiberglass, carbon fiber, wood, or any other suitable material. As a non-limiting example, at least a structural feature may be constructed from additively manufactured polymer material with a carbon fiber exterior; aluminum parts or other elements may be enclosed for structural strength, or for purposes of supporting, for instance, vibration, torque or shear stresses imposed by at least propulsor 708. Persons skilled in the art, upon reviewing the entirety of this disclosure, will be aware of various materials, combinations of materials, and/or constructions techniques.

Still referring to FIG. 7, electric aircraft 700 may include a vertical takeoff and landing aircraft (eVTOL). As used herein, a vertical take-off and landing (eVTOL) aircraft is one that can hover, take off, and land vertically. An eVTOL, as used herein, is an electrically powered aircraft typically using an energy source, of a plurality of energy sources to power the aircraft. In order to optimize the power and energy necessary to propel the aircraft. eVTOL may be capable of rotor-based cruising flight, rotor-based takeoff, rotor-based landing, fixed-wing cruising flight, airplane-style takeoff, airplane-style landing, and/or any combination thereof. Rotor-based flight, as described herein, is where the aircraft generated lift and propulsion by way of one or more powered rotors coupled with an engine, such as a "quad copter," multi-rotor helicopter, or other vehicle that maintains its lift primarily using downward thrusting propulsors. Fixed-wing flight, as described herein, is where the aircraft is capable of flight using wings and/or foils that generate life caused by the aircraft's forward airspeed and the shape of the wings and/or foils, such as airplane-style flight.

With continued reference to FIG. 7, a number of aerodynamic forces may act upon the electric aircraft 700 during flight. Forces acting on electric aircraft 700 during flight may include, without limitation, thrust, the forward force produced by the rotating element of the electric aircraft 700 and acts parallel to the longitudinal axis. Another force acting upon electric aircraft 700 may be, without limitation, drag, which may be defined as a rearward retarding force which is caused by disruption of airflow by any protruding surface of the electric aircraft 700 such as, without limitation, the wing, rotor, and fuselage. Drag may oppose thrust and acts rearward parallel to the relative wind. A further force acting upon electric aircraft 700 may include, without limitation, weight, which may include a combined load of the electric aircraft 700 itself, crew, baggage, and/or fuel. Weight may pull electric aircraft 700 downward due to the force of gravity. An additional force acting on electric aircraft 700 may include, without limitation, lift, which may act to oppose the downward force of weight and may be produced by the dynamic effect of air acting on the airfoil and/or downward thrust from the propulsor 708 of the electric aircraft. Lift generated by the airfoil may depend on speed of airflow, density of air, total area of an airfoil and/or segment thereof, and/or an angle of attack between air and the airfoil. For example, and without limitation, electric aircraft 700 are designed to be as lightweight as possible. Reducing the weight of the aircraft and designing to reduce the number of components is essential to optimize the weight. To save energy, it may be useful to reduce weight of components of electric aircraft 700, including without limitation propulsors and/or propulsion assemblies. In an embodiment, motor 724 may eliminate need for many external structural features that otherwise might be needed to join one component to another component. Motor 724 may also increase energy efficiency by enabling a lower physical propulsor profile, reducing drag and/or wind resistance. This may also increase durability by lessening the extent to which drag and/or wind resistance add to forces acting on electric aircraft 700 and/or propulsors.

Figure 8:
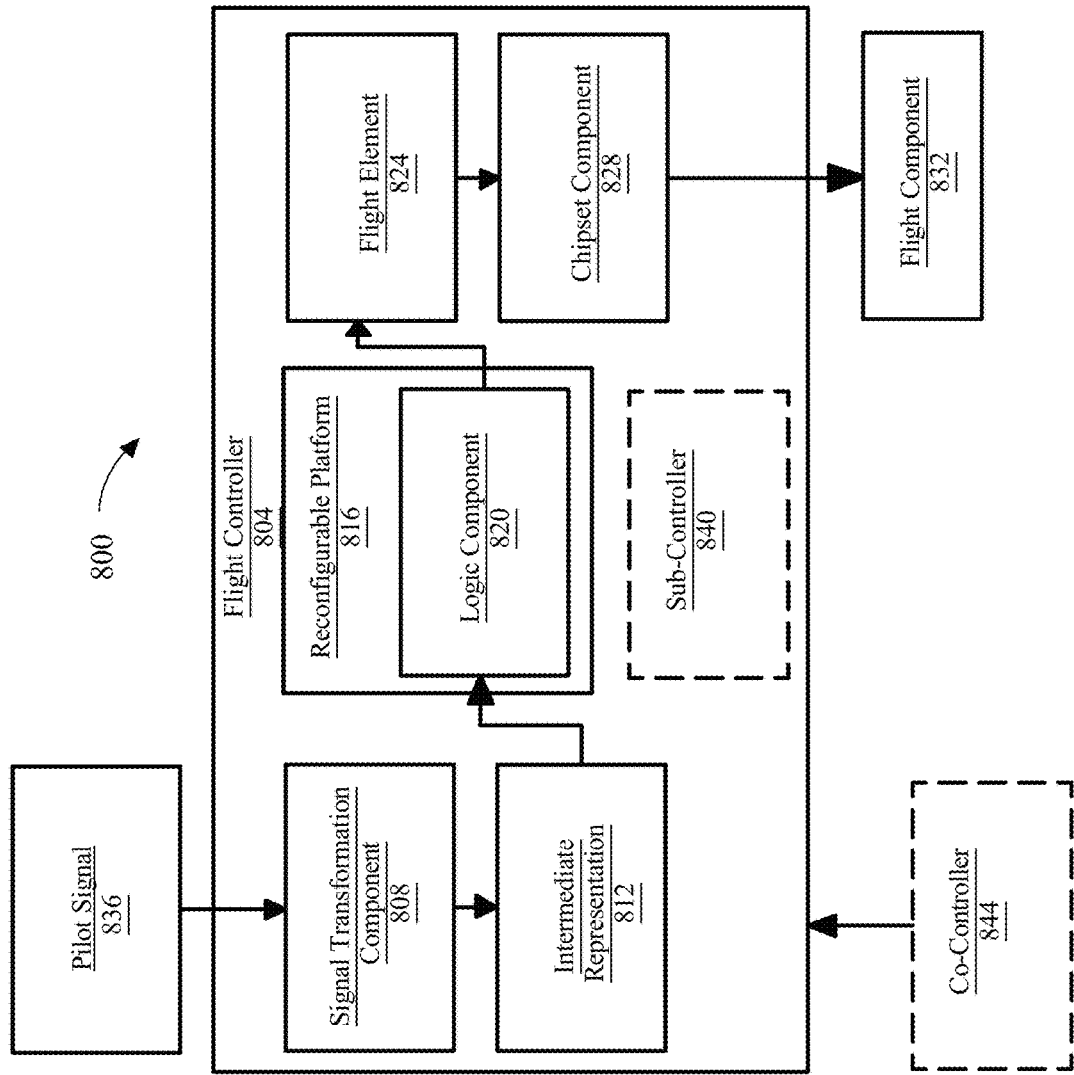
FIG. 8 is a block diagram depicting an exemplary flight controller in accordance with one or more embodiments of the present disclosure.

Now referring to FIG. 8, an exemplary embodiment 800 of a flight controller 804 is illustrated. As used in this disclosure a "flight controller" is a computing device of a plurality of computing devices dedicated to data storage, security, distribution of traffic for load balancing, and flight instruction. Flight controller 804 may include and/or communicate with any computing device as described in this disclosure, including without limitation a microcontroller, microprocessor, digital signal processor (DSP) and/or system on a chip (SoC) as described in this disclosure. Further, flight controller 804 may include a single computing device operating independently, or may include two or more computing device operating in concert, in parallel, sequentially or the like; two or more computing devices may be included together in a single computing device or in two or more computing devices. In embodiments, flight controller 804 may be installed in an aircraft, may control the aircraft remotely, and/or may include an element installed in the aircraft and a remote element in communication therewith.

In an embodiment, and still referring to FIG. 8, flight controller 804 may include a signal transformation component 808. As used in this disclosure a "signal transformation component" is a component that transforms and/or converts a first signal to a second signal, wherein a signal may include one or more digital and/or analog signals. For example, and without limitation, signal transformation component 808 may be configured to perform one or more operations such as preprocessing, lexical analysis, parsing, semantic analysis, and the like thereof. In an embodiment, and without limitation, signal transformation component 808 may include one or more analog-to-digital convertors that transform a first signal of an analog signal to a second signal of a digital signal. For example, and without limitation, an analog-to-digital converter may convert an analog input signal to a 10-bit binary digital representation of that signal. In another embodiment, signal transformation component 808 may include transforming one or more low-level languages such as, but not limited to, machine languages and/or assembly languages. For example, and without limitation, signal transformation component 808 may include transforming a binary language signal to an assembly language signal. In an embodiment, and without limitation, signal transformation component 808 may include transforming one or more high-level languages and/or formal languages such as but not limited to alphabets, strings, and/or languages. For example, and without limitation, high-level languages may include one or more system languages, scripting languages, domain-specific languages, visual languages, esoteric languages, and the like thereof. As a further non-limiting example, high-level languages may include one or more algebraic formula languages, business data languages, string and list languages, object-oriented languages, and the like thereof.

Still referring to FIG. 8, signal transformation component 808 may be configured to optimize an intermediate representation 812. As used in this disclosure an "intermediate representation" is a data structure and/or code that represents the input signal. Signal transformation component 808 may optimize intermediate representation as a function of a data-flow analysis, dependence analysis, alias analysis, pointer analysis, escape analysis, and the like thereof. In an embodiment, and without limitation, signal transformation component 808 may optimize intermediate representation 812 as a function of one or more inline expansions, dead code eliminations, constant propagation, loop transformations, and/or automatic parallelization functions. In another embodiment, signal transformation component 808 may optimize intermediate representation as a function of a machine dependent optimization such as a peephole optimization, wherein a peephole optimization may rewrite short sequences of code into more efficient sequences of code. Signal transformation component 808 may optimize intermediate representation to generate an output language, wherein an "output language," as used herein, is the native machine language of flight controller 804. For example, and without limitation, native machine language may include one or more binary and/or numerical languages.

In an embodiment, and without limitation, signal transformation component 808 may include transform one or more inputs and outputs as a function of an error correction code. An error correction code, also known as error correcting code (ECC), is an encoding of a message or lot of data using redundant information, permitting recovery of corrupted data. An ECC may include a block code, in which information is encoded on fixed-size packets and/or blocks of data elements such as symbols of predetermined size, bits, or the like. Reed-Solomon coding, in which message symbols within a symbol set having q symbols are encoded as coefficients of a polynomial of degree less than or equal to a natural number k, over a finite field F with q elements; strings so encoded have a minimum hamming distance of k+1, and permit correction of (q−k−1)/2 erroneous symbols. Block code may alternatively or additionally be implemented using Golay coding, also known as binary Golay coding, Bose-Chaudhuri, Hocquenghuem (BCH) coding, multidimensional parity-check coding, and/or Hamming codes. An ECC may alternatively or additionally be based on a convolutional code.

In an embodiment, and still referring to FIG. 8, flight controller 804 may include a reconfigurable hardware platform 816. A "reconfigurable hardware platform," as used herein, is a component and/or unit of hardware that may be reprogrammed, such that, for instance, a data path between elements such as logic gates or other digital circuit elements may be modified to change an algorithm, state, logical sequence, or the like of the component and/or unit. This may be accomplished with such flexible high-speed computing fabrics as field-programmable gate arrays (FPGAs), which may include a grid of interconnected logic gates, connections between which may be severed and/or restored to program in modified logic. Reconfigurable hardware platform 816 may be reconfigured to enact any algorithm and/or algorithm selection process received from another computing device and/or created using machine-learning processes.

Still referring to FIG. 8, reconfigurable hardware platform 816 may include a logic component 820. As used in this disclosure a "logic component" is a component that executes instructions on output language. For example, and without limitation, logic component may perform basic arithmetic, logic, controlling, input/output operations, and the like thereof. Logic component 820 may include any suitable processor, such as without limitation a component incorporating logical circuitry for performing arithmetic and logical operations, such as an arithmetic and logic unit (ALU), which may be regulated with a state machine and directed by operational inputs from memory and/or sensors; logic component 820 may be organized according to Von Neumann and/or Harvard architecture as a non-limiting example. Logic component 820 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC). In an embodiment, logic component 820 may include one or more integrated circuit microprocessors, which may contain one or more central processing units, central processors, and/or main processors, on a single metal-oxide-semiconductor chip. Logic component 820 may be configured to execute a sequence of stored instructions to be performed on the output language and/or intermediate representation 812. Logic component 820 may be configured to fetch and/or retrieve the instruction from a memory cache, wherein a "memory cache," as used in this disclosure, is a stored instruction set on flight controller 804. Logic component 820 may be configured to decode the instruction retrieved from the memory cache to opcodes and/or operands. Logic component 820 may be configured to execute the instruction on intermediate representation 812 and/or output language. For example, and without limitation, logic component 820 may be configured to execute an addition operation on intermediate representation 812 and/or output language.

In an embodiment, and without limitation, logic component 820 may be configured to calculate a flight element 824. As used in this disclosure a "flight element" is an element of datum denoting a relative status of aircraft. For example, and without limitation, flight element 824 may denote one or more torques, thrusts, airspeed velocities, forces, altitudes, groundspeed velocities, directions during flight, directions facing, forces, orientations, and the like thereof. For example, and without limitation, flight element 824 may denote that aircraft is cruising at an altitude and/or with a sufficient magnitude of forward thrust. As a further non-limiting example, flight status may denote that is building thrust and/or groundspeed velocity in preparation for a takeoff. As a further non-limiting example, flight element 824 may denote that aircraft is following a flight path accurately and/or sufficiently.

Still referring to FIG. 8, flight controller 804 may include a chipset component 828. As used in this disclosure a "chipset component" is a component that manages data flow. In an embodiment, and without limitation, chipset component 828 may include a northbridge data flow path, wherein the northbridge dataflow path may manage data flow from logic component 820 to a high-speed device and/or component, such as a RAM, graphics controller, and the like thereof. In another embodiment, and without limitation, chipset component 828 may include a southbridge data flow path, wherein the southbridge dataflow path may manage data flow from logic component 820 to lower-speed peripheral buses, such as a peripheral component interconnect (PCI), industry standard architecture (ICA), and the like thereof. In an embodiment, and without limitation, southbridge data flow path may include managing data flow between peripheral connections such as ethernet, USB, audio devices, and the like thereof. Additionally or alternatively, chipset component 828 may manage data flow between logic component 820, memory cache, and a flight component 832. As used in this disclosure a "flight component" is a portion of an aircraft that can be moved or adjusted to affect one or more flight elements. For example, flight component 1432 may include a component used to affect the aircrafts' roll and pitch which may comprise one or more ailerons. As a further example, flight component 832 may include a rudder to control yaw of an aircraft. In an embodiment, chipset component 828 may be configured to communicate with a plurality of flight components as a function of flight element 824. For example, and without limitation, chipset component 828 may transmit to an aircraft rotor to reduce torque of a first lift propulsor and increase the forward thrust produced by a pusher component to perform a flight maneuver.

In an embodiment, and still referring to FIG. 8, flight controller 804 may be configured generate an autonomous function. As used in this disclosure an "autonomous function" is a mode and/or function of flight controller 804 that controls aircraft automatically. For example, and without limitation, autonomous function may perform one or more aircraft maneuvers, take offs, landings, altitude adjustments, flight leveling adjustments, turns, climbs, and/or descents. As a further non-limiting example, autonomous function may adjust one or more airspeed velocities, thrusts, torques, and/or groundspeed velocities. As a further non-limiting example, autonomous function may perform one or more flight path corrections and/or flight path modifications as a function of flight element 824. In an embodiment, autonomous function may include one or more modes of autonomy such as, but not limited to, autonomous mode, semi-autonomous mode, and/or non-autonomous mode. As used in this disclosure "autonomous mode" is a mode that automatically adjusts and/or controls aircraft and/or the maneuvers of aircraft in its entirety. For example, autonomous mode may denote that flight controller 804 will adjust the aircraft. As used in this disclosure a "semi-autonomous mode" is a mode that automatically adjusts and/or controls a portion and/or section of aircraft. For example, and without limitation, semi-autonomous mode may denote that a pilot will control the propulsors, wherein flight controller 804 will control the ailerons and/or rudders. As used in this disclosure "non-autonomous mode" is a mode that denotes a pilot will control aircraft and/or maneuvers of aircraft in its entirety.

In an embodiment, and still referring to FIG. 8, flight controller 804 may generate autonomous function as a function of an autonomous machine-learning model. As used in this disclosure an "autonomous machine-learning model" is a machine-learning model to produce an autonomous function output given flight element 824 and a pilot signal 836 as inputs; this is in contrast to a non-machine learning software program where the commands to be executed are determined in advance by a user and written in a programming language. As used in this disclosure a "pilot signal" is an element of datum representing one or more functions a pilot is controlling and/or adjusting. For example, pilot signal 836 may denote that a pilot is controlling and/or maneuvering ailerons, wherein the pilot is not in control of the rudders and/or propulsors. In an embodiment, pilot signal 836 may include an implicit signal and/or an explicit signal. For example, and without limitation, pilot signal 836 may include an explicit signal, wherein the pilot explicitly states there is a lack of control and/or desire for autonomous function. As a further non-limiting example, pilot signal 836 may include an explicit signal directing flight controller 804 to control and/or maintain a portion of aircraft, a portion of the flight plan, the entire aircraft, and/or the entire flight plan. As a further non-limiting example, pilot signal 836 may include an implicit signal, wherein flight controller 804 detects a lack of control such as by a malfunction, torque alteration, flight path deviation, and the like thereof. In an embodiment, and without limitation, pilot signal 836 may include one or more explicit signals to reduce torque, and/or one or more implicit signals that torque may be reduced due to reduction of airspeed velocity. In an embodiment, and without limitation, pilot signal 836 may include one or more local and/or global signals. For example, and without limitation, pilot signal 836 may include a local signal that is transmitted by a pilot and/or crew member. As a further non-limiting example, pilot signal 836 may include a global signal that is transmitted by air traffic control and/or one or more remote users that are in communication with the pilot of aircraft. In an embodiment, pilot signal 836 may be received as a function of a tri-state bus and/or multiplexor that denotes an explicit pilot signal should be transmitted prior to any implicit or global pilot signal.

Still referring to FIG. 8, autonomous machine-learning model may include one or more autonomous machine-learning processes such as supervised, unsupervised, or reinforcement machine-learning processes that flight controller 804 and/or a remote device may or may not use in the generation of autonomous function. As used in this disclosure "remote device" is an external device to flight controller 804. Additionally or alternatively, autonomous machine-learning model may include one or more autonomous machine-learning processes that a field-programmable gate array (FPGA) may or may not use in the generation of autonomous function. Autonomous machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

In an embodiment, and still referring to FIG. 8, autonomous machine learning model may be trained as a function of autonomous training data, wherein autonomous training data may correlate a flight element, pilot signal, and/or simulation data to an autonomous function. For example, and without limitation, a flight element of an airspeed velocity, a pilot signal of limited and/or no control of propulsors, and a simulation data of required airspeed velocity to reach the destination may result in an autonomous function that includes a semi-autonomous mode to increase thrust of the propulsors. Autonomous training data may be received as a function of user-entered valuations of flight elements, pilot signals, simulation data, and/or autonomous functions. Flight controller 804 may receive autonomous training data by receiving correlations of flight element, pilot signal, and/or simulation data to an autonomous function that were previously received and/or determined during a previous iteration of generation of autonomous function. Autonomous training data may be received by one or more remote devices and/or FPGAs that at least correlate a flight element, pilot signal, and/or simulation data to an autonomous function. Autonomous training data may be received in the form of one or more user-entered correlations of a flight element, pilot signal, and/or simulation data to an autonomous function.

Still referring to FIG. 8, flight controller 804 may receive autonomous machine-learning model from a remote device and/or FPGA that utilizes one or more autonomous machine learning processes, wherein a remote device and an FPGA is described above in detail. For example, and without limitation, a remote device may include a computing device, external device, processor, FPGA, microprocessor and the like thereof. Remote device and/or FPGA may perform the autonomous machine-learning process using autonomous training data to generate autonomous function and transmit the output to flight controller 804. Remote device and/or FPGA may transmit a signal, bit, datum, or parameter to flight controller 804 that at least relates to autonomous function. Additionally or alternatively, the remote device and/or FPGA may provide an updated machine-learning model. For example, and without limitation, an updated machine-learning model may be comprised of a firmware update, a software update, an autonomous machine-learning process correction, and the like thereof. As a non-limiting example a software update may incorporate a new simulation data that relates to a modified flight element. Additionally or alternatively, the updated machine learning model may be transmitted to the remote device and/or FPGA, wherein the remote device and/or FPGA may replace the autonomous machine-learning model with the updated machine-learning model and generate the autonomous function as a function of the flight element, pilot signal, and/or simulation data using the updated machine-learning model. The updated machine-learning model may be transmitted by the remote device and/or FPGA and received by flight controller 804 as a software update, firmware update, or corrected autonomous machine-learning model. For example, and without limitation autonomous machine learning model may utilize a neural net machine-learning process, wherein the updated machine-learning model may incorporate a gradient boosting machine-learning process.

Still referring to FIG. 8, flight controller 804 may include, be included in, and/or communicate with a mobile device such as a mobile telephone or smartphone. Further, flight controller may communicate with one or more additional devices as described below in further detail via a network interface device. The network interface device may be utilized for commutatively connecting a flight controller to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. The network may include any network topology and can may employ a wired and/or a wireless mode of communication.

In an embodiment, and still referring to FIG. 8, flight controller 804 may include, but is not limited to, for example, a cluster of flight controllers in a first location and a second flight controller or cluster of flight controllers in a second location. Flight controller 804 may include one or more flight controllers dedicated to data storage, security, distribution of traffic for load balancing, and the like. Flight controller 804 may be configured to distribute one or more computing tasks as described below across a plurality of flight controllers, which may operate in parallel, in series, redundantly, or in any other manner used for distribution of tasks or memory between computing devices. For example, and without limitation, flight controller 804 may implement a control algorithm to distribute and/or command the plurality of flight controllers. As used in this disclosure a "control algorithm" is a finite sequence of well-defined computer implementable instructions that may determine the flight component of the plurality of flight components to be adjusted. For example, and without limitation, control algorithm may include one or more algorithms that reduce and/or prevent aviation asymmetry. As a further non-limiting example, control algorithms may include one or more models generated as a function of a software including, but not limited to Simulink by MathWorks, Natick, Massachusetts, USA. In an embodiment, and without limitation, control algorithm may be configured to generate an auto-code, wherein an "auto-code," is used herein, is a code and/or algorithm that is generated as a function of the one or more models and/or software's. In another embodiment, control algorithm may be configured to produce a segmented control algorithm. As used in this disclosure a "segmented control algorithm" is control algorithm that has been separated and/or parsed into discrete sections. For example, and without limitation, segmented control algorithm may parse control algorithm into two or more segments, wherein each segment of control algorithm may be performed by one or more flight controllers operating on distinct flight components.

In an embodiment, and still referring to FIG. 8, control algorithm may be configured to determine a segmentation boundary as a function of segmented control algorithm. As used in this disclosure a "segmentation boundary" is a limit and/or delineation associated with the segments of the segmented control algorithm. For example, and without limitation, segmentation boundary may denote that a segment in the control algorithm has a first starting section and/or a first ending section. As a further non-limiting example, segmentation boundary may include one or more boundaries associated with an ability of flight component 832. In an embodiment, control algorithm may be configured to create an optimized signal communication as a function of segmentation boundary. For example, and without limitation, optimized signal communication may include identifying the discrete timing required to transmit and/or receive the one or more segmentation boundaries. In an embodiment, and without limitation, creating optimized signal communication further comprises separating a plurality of signal codes across the plurality of flight controllers. For example, and without limitation the plurality of flight controllers may include one or more formal networks, wherein formal networks transmit data along an authority chain and/or are limited to task-related communications. As a further non-limiting example, communication network may include informal networks, wherein informal networks transmit data in any direction. In an embodiment, and without limitation, the plurality of flight controllers may include a chain path, wherein a "chain path," as used herein, is a linear communication path comprising a hierarchy that data may flow through. In an embodiment, and without limitation, the plurality of flight controllers may include an all-channel path, wherein an "all-channel path," as used herein, is a communication path that is not restricted to a particular direction. For example, and without limitation, data may be transmitted upward, downward, laterally, and the like thereof. In an embodiment, and without limitation, the plurality of flight controllers may include one or more neural networks that assign a weighted value to a transmitted datum. For example, and without limitation, a weighted value may be assigned as a function of one or more signals denoting that a flight component is malfunctioning and/or in a failure state.

Still referring to FIG. 8, the plurality of flight controllers may include a master bus controller. As used in this disclosure a "master bus controller" is one or more devices and/or components that are connected to a bus to initiate a direct memory access transaction, wherein a bus is one or more terminals in a bus architecture. Master bus controller may communicate using synchronous and/or asynchronous bus control protocols. In an embodiment, master bus controller may include flight controller 804. In another embodiment, master bus controller may include one or more universal asynchronous receiver-transmitters (UART). For example, and without limitation, master bus controller may include one or more bus architectures that allow a bus to initiate a direct memory access transaction from one or more buses in the bus architectures. As a further non-limiting example, master bus controller may include one or more peripheral devices and/or components to communicate with another peripheral device and/or component and/or the master bus controller. In an embodiment, master bus controller may be configured to perform bus arbitration. As used in this disclosure "bus arbitration" is method and/or scheme to prevent multiple buses from attempting to communicate with and/or connect to master bus controller. For example and without limitation, bus arbitration may include one or more schemes such as a small computer interface system, wherein a small computer interface system is a set of standards for physical connecting and transferring data between peripheral devices and master bus controller by defining commands, protocols, electrical, optical, and/or logical interfaces. In an embodiment, master bus controller may receive intermediate representation 812 and/or output language from logic component 820, wherein output language may include one or more analog-to-digital conversions, low bit rate transmissions, message encryptions, digital signals, binary signals, logic signals, analog signals, and the like thereof described above in detail.

Still referring to FIG. 8, master bus controller may communicate with a slave bus. As used in this disclosure a "slave bus" is one or more peripheral devices and/or components that initiate a bus transfer. For example, and without limitation, slave bus may receive one or more controls and/or asymmetric communications from master bus controller, wherein slave bus transfers data stored to master bus controller. In an embodiment, and without limitation, slave bus may include one or more internal buses, such as but not limited to a/an internal data bus, memory bus, system bus, front-side bus, and the like thereof. In another embodiment, and without limitation, slave bus may include one or more external buses such as external flight controllers, external computers, remote devices, printers, aircraft computer systems, flight control systems, and the like thereof.

In an embodiment, and still referring to FIG. 14, control algorithm may optimize signal communication as a function of determining one or more discrete timings. For example, and without limitation master bus controller may synchronize timing of the segmented control algorithm by injecting high priority timing signals on a bus of the master bus control. As used in this disclosure a "high priority timing signal" is information denoting that the information is important. For example, and without limitation, high priority timing signal may denote that a section of control algorithm is of high priority and should be analyzed and/or transmitted prior to any other sections being analyzed and/or transmitted. In an embodiment, high priority timing signal may include one or more priority packets. As used in this disclosure a "priority packet" is a formatted unit of data that is communicated between the plurality of flight controllers. For example, and without limitation, priority packet may denote that a section of control algorithm should be used and/or is of greater priority than other sections.

Still referring to FIG. 14, flight controller 1404 may also be implemented using a "shared nothing" architecture in which data is cached at the worker, in an embodiment, this may enable scalability of aircraft and/or computing device. Flight controller 1404 may include a distributer flight controller. As used in this disclosure a "distributer flight controller" is a component that adjusts and/or controls a plurality of flight components as a function of a plurality of flight controllers. For example, distributer flight controller may include a flight controller that communicates with a plurality of additional flight controllers and/or clusters of flight controllers. In an embodiment, distributed flight control may include one or more neural networks. For example, neural network also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 8, a node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above. In an embodiment, and without limitation, a neural network may receive semantic units as inputs and output vectors representing such semantic units according to weights $w_i$ that are derived using machine-learning processes as described in this disclosure.

Still referring to FIG. 8, flight controller may include a sub-controller 840. As used in this disclosure a "sub-controller" is a controller and/or component that is part of a distributed controller as described above; for instance, flight controller 804 may be and/or include a distributed flight controller made up of one or more sub-controllers. For example, and without limitation, sub-controller 840 may include any controllers and/or components thereof that are similar to distributed flight controller and/or flight controller as described above. Sub-controller 840 may include any component of any flight controller as described above. Sub-controller 840 may be implemented in any manner suitable for implementation of a flight controller as described above. As a further non-limiting example, sub-controller 840 may include one or more processors, logic components and/or computing devices capable of receiving, processing, and/or transmitting data across the distributed flight controller as described above. As a further non-limiting example, sub-controller 840 may include a controller that receives a signal from a first flight controller and/or first distributed flight controller component and transmits the signal to a plurality of additional sub-controllers and/or flight components.

Still referring to FIG. 8, flight controller may include a co-controller 844. As used in this disclosure a "co-controller" is a controller and/or component that joins flight controller 804 as components and/or nodes of a distributer flight controller as described above. For example, and without limitation, co-controller 844 may include one or more controllers and/or components that are similar to flight controller 804. As a further non-limiting example, co-controller 844 may include any controller and/or component that joins flight controller 804 to distributer flight controller. As a further non-limiting example, co-controller 844 may include one or more processors, logic components and/or computing devices capable of receiving, processing, and/or transmitting data to and/or from flight controller 804 to distributed flight control system. Co-controller 844 may include any component of any flight controller as described above. Co-controller 844 may be implemented in any manner suitable for implementation of a flight controller as described above.

In an embodiment, and with continued reference to FIG. 8, flight controller 804 may be designed and/or configured to perform any method, method step, or sequence of method steps in any embodiment described in this disclosure, in any order and with any degree of repetition. For instance, flight controller 804 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Flight controller may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 9:
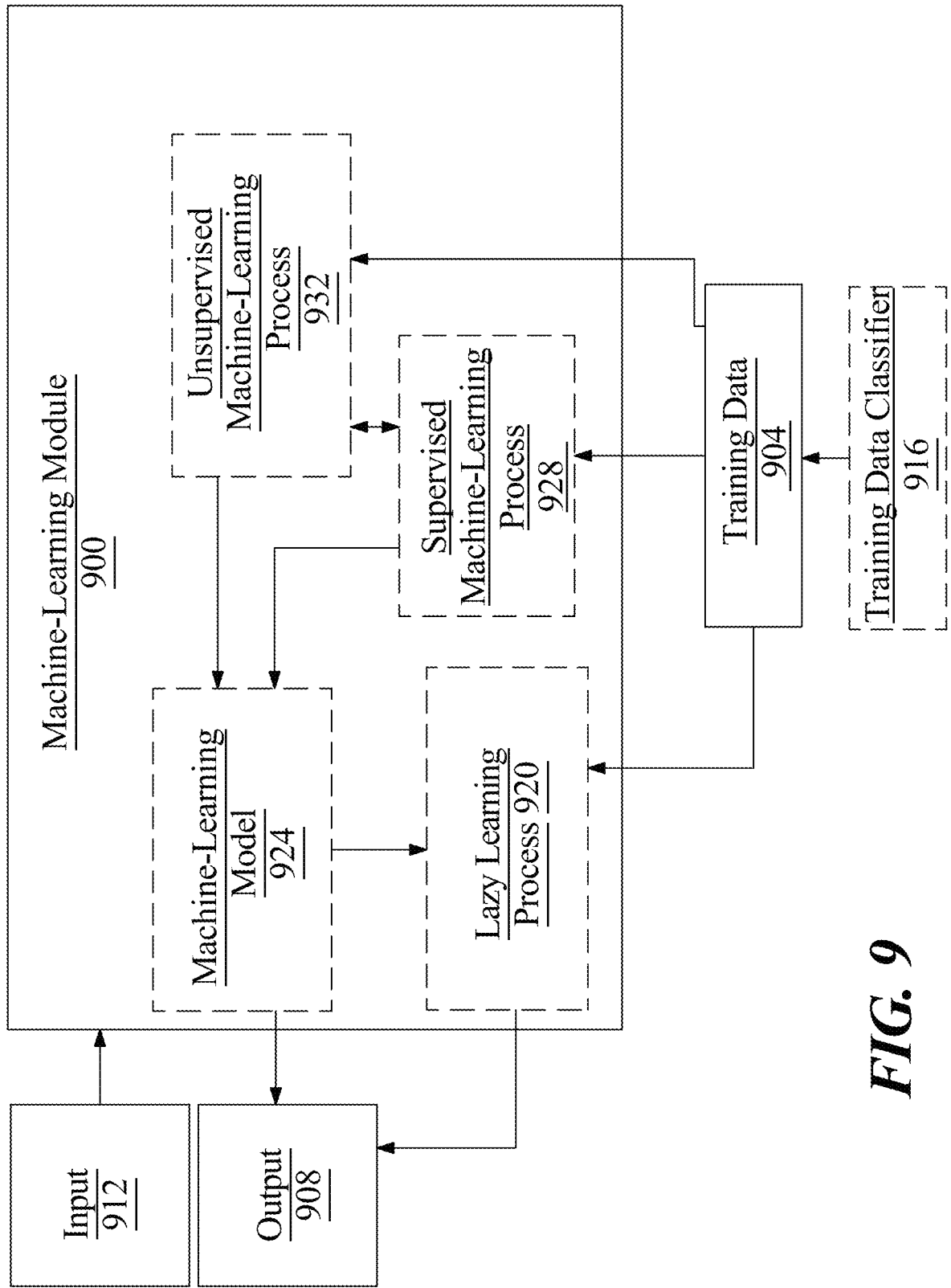
FIG. 9 is a block diagram of an exemplary machine-learning process in accordance with one or more embodiments of the present disclosure.

Referring now to FIG. 9, an exemplary embodiment of a machine-learning module 900 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 904 to generate an algorithm that will be performed by a computing device/module to produce outputs 908 given data provided as inputs 912; this is in contrast to a non-machine learning software program where the commands to be executed are determined in advance by a user and written in a programming language.

Still referring to FIG. 9, "training data," as used herein, is data containing correlations that a machine-learning process may use to model relationships between two or more categories of data elements. For instance, and without limitation, training data 904 may include a plurality of data entries, each entry representing a set of data elements that were recorded, received, and/or generated together; data elements may be correlated by shared existence in a given data entry, by proximity in a given data entry, or the like. Multiple data entries in training data 904 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 904 according to various correlations; correlations may indicate causative and/or predictive links between categories of data elements, which may be modeled as relationships such as mathematical relationships by machine-learning processes as described in further detail below. Training data 904 may be formatted and/or organized by categories of data elements, for instance by associating data elements with one or more descriptors corresponding to categories of data elements. As a non-limiting example, training data 904 may include data entered in standardized forms by persons or processes, such that entry of a given data element in a given field in a form may be mapped to one or more descriptors of categories. Elements in training data 904 may be linked to descriptors of categories by tags, tokens, or other data elements; for instance, and without limitation, training data 904 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 9, training data 904 may include one or more elements that are not categorized; that is, training data 904 may not be formatted or contain descriptors for some elements of data. Machine-learning algorithms and/or other processes may sort training data 904 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 904 to be made applicable for two or more distinct machine-learning algorithms as described in further detail below. Training data 904 used by machine-learning module 900 may correlate any input data as described in this disclosure to any output data as described in this disclosure. As a non-limiting illustrative example flight elements and/or pilot signals may be inputs, wherein an output may be an autonomous function.

Further referring to FIG. 9, training data may be filtered, sorted, and/or selected using one or more supervised and/or unsupervised machine-learning processes and/or models as described in further detail below; such models may include without limitation a training data classifier 916. Training data classifier 916 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 900 may generate a classifier using a classification algorithm, defined as a processes whereby a computing device and/or any module and/or component operating thereon derives a classifier from training data 904. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 1616 may classify elements of training data to sub-categories of flight elements such as torques, forces, thrusts, directions, and the like thereof.

Still referring to FIG. 9, machine-learning module 900 may be configured to perform a lazy-learning process 920 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 904. Heuristic may include selecting some number of highest-ranking associations and/or training data 904 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 9, machine-learning processes as described in this disclosure may be used to generate machine-learning models 924. A "machine-learning model," as used in this disclosure, is a mathematical and/or algorithmic representation of a relationship between inputs and outputs, as generated using any machine-learning process including without limitation any process as described above and stored in memory; an input is submitted to a machine-learning model 924 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 924 may be generated by creating an artificial neural network, such as a convolutional neural network comprising an input layer of nodes, one or more intermediate layers, and an output layer of nodes. Connections between nodes may be created via the process of "training" the network, in which elements from a training data 904 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 9, machine-learning algorithms may include at least a supervised machine-learning process 928. At least a supervised machine-learning process 928, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include flight elements and/or pilot signals as described above as inputs, autonomous functions as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 904. Persons skilled in the art, upon reviewing the entirety of this disclosure, will be aware of various possible variations of at least a supervised machine-learning process 928 that may be used to determine relation between inputs and outputs. Supervised machine-learning processes may include classification algorithms as defined above.

Further referring to FIG. 9, machine learning processes may include at least an unsupervised machine-learning processes 932. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 9, machine-learning module 900 may be designed and configured to create a machine-learning model 924 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 9, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 10:
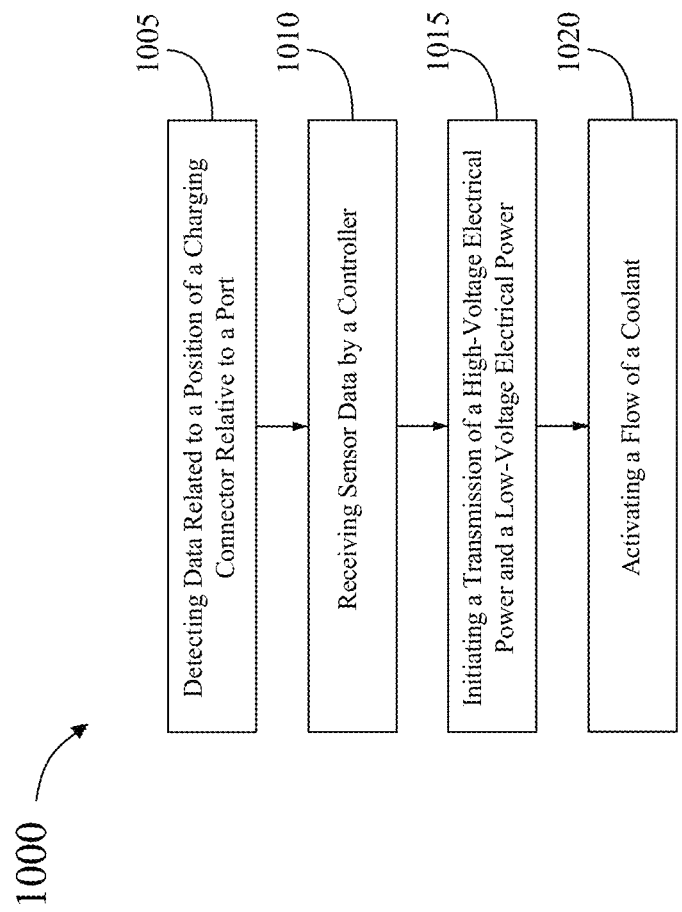
FIG. 10 is a flow diagram illustrating an exemplary method of use for an exemplary ground support cart in accordance with one or more embodiments of the present disclosure.

Referring now to FIG. 10, an exemplary method 1000 of charging an electric aircraft using connector 100. An electric aircraft may include any electric aircraft described in this disclosure, for example with reference to FIGS. 1-9. Connector may include any connector described in this disclosure, for example with reference to FIGS. 1-9. At step 1005, method 1000 may include detecting, by a proximity sensor, data related to a position of a charging connector relative to a port of an electric aircraft. Proximity sensor may include any proximity sensor described in this disclosure, for example with reference to FIGS. 1-9. In some embodiments, electric aircraft port may include proximity sensor. In other embodiments, connector may include proximity sensor. Electric aircraft port may include any electric aircraft port described in this disclosure, for example with reference to FIGS. 1-9. In some cases, housing may include a fastener for removable attachment with port. Fastener may include any fastener described in this disclosure, for example with reference to FIGS. 1-9.

With continued reference to FIG. 10, at step 1010, method 1000 may include receiving, by controller, which is communicatively connected to proximity sensor, the data.

With continued reference to FIG. 10, at step 1015, method 1000 may include initiating, by controller, a transmission of high-voltage electrical power through a high-voltage conductor of the connector to the port and low-voltage electrical power through a low-voltage conductor of the connector to the port. Transmission of high-voltage electrical power may include conducting high-voltage electrical power through high-voltage electrical conductor. High-voltage conductor may include any conductor described in this disclosure, for example with reference to FIGS. 1-9. Transmission of low-voltage electrical power may include conducting, using a low-voltage conductor, low-voltage electrical power. Low-voltage conductor may include any conductor described in this disclosure, for example with reference to FIGS. 1-9.

With continued reference to FIG. 10, method 1000 may further include conducting, using a control signal conductor, a control signal. Control signal conductor may include any conductor described in this disclosure, for example with reference to FIGS. 1-11. Control signal may include any signal described in this disclosure, for example with reference to FIGS. 1-11. In some embodiments, controller may receive or transmit a control signal using control signal conductor. Controller may include any controller described in this disclosure, for example, with references to FIGS. 1-11.

In one or more embodiments, method 1000 may also include conducting, using at least a ground conductor, to a ground. Ground conductor may include any conductor described in this disclosure, for example with reference to FIGS. 1-9. Ground may include any ground described in this disclosure, for example with reference to FIGS. 1-9.

In one or more embodiments, method 1000 may also include conducting, using at least a proximity signal conductor, a proximity signal indicative of attachment with port when housing is mated with port. Proximity signal conductor may include any conductor described in this disclosure, for example with reference to FIGS. 1-9. Proximity signal may include any signal described in this disclosure, for example with reference to FIGS. 1-9. In some embodiments, method 1600 may additionally include generating, using a proximity sensor electrically communicative with at least a proximity signal conductor, proximity signal, when housing is mated with port. Proximity sensor may include any sensor described in this disclosure, for example with reference to FIGS. 1-15.

In one or more embodiments, method 1000 may additionally include conducting, using one or more conductors, a communication signal by way of power line communication. Communication signal may include any signal described in this disclosure, for example with reference to FIGS. 1-9. Power line communication may include any power line communication process described in this disclosure, for example with reference to FIGS. 1-9.

With continued reference to FIG. 10, at step 1020, method 1600 may include activating, by controller, a flow of coolant through at least a cooling channel of the connector. Cooling channel may contain a flow of coolant. Cooling channel may include any cooling channel described in this disclosure, for example with reference to FIGS. 1-9. Flow of a coolant may include any flow of a coolant and/or coolant flow described in this disclosure, for example with reference to FIGS. 1-9. In some embodiments, cooling channel is in fluidic communication with a coolant source. In some embodiments, cooling channel traverses through connector. In other embodiments, cooling channel traverses through connector and electric aircraft, such as through an energy source of electric aircraft. In some embodiments, cooling channel is located in thermal communication with one or more of a high-voltage conductor and/or a low-voltage conductor. In some cases, method 1600 additionally includes transferring heat generated by one or more of conductor into coolant. Coolant may include any coolant described in this disclosure, for example with reference to FIGS. 1-9. In some embodiments, coolant may include a gas.

Still referring to FIG. 10, in some embodiments, method 1000 may additionally include sealing, using a seal, at least a cooling channel and its associated mating component together at a joint, when housing is mated with electric vehicle port. Seal may include any seal described in this disclosure, for example with reference to FIGS. 1-9. Joint may include any joint described in this disclosure, for example with reference to FIGS. 1-9.

Still referring to FIG. 10, in some embodiments, method 1000 may additionally include charging using at least a conductor, at least a battery of electric vehicle. Conductor may include any conductor described in this disclosure, including with reference to FIGS. 1-9.

Still referring to FIG. 10, in some embodiments, method 1600 may additionally include charging, using the connector, an energy source, such as a battery, of electric aircraft. Electric aircraft may include any electric aircraft described in this disclosure, including with reference to FIGS. 1-9.

Exemplary embodiments may be further understood without limitation, with reference to the table below.

|  | Min. | Max. | Nom. |
|---|---|---|---|
| Electrical charging current power (AC) | 1 KW | 200 KW | 20 KW |
| Electrical charging current (AC) | 10 Amps | 450 Amps | 80 Amps |
| Electrical charging current power (DC) | 1 KW | 250 KW | 25 KW |
| Electrical charging current (DC) | 10 Amps | 500 Amps | 50 Amps |
| Battery acceptable temperature change during charging | −30° C. | +50° C. | 0° C. |
| Conductor acceptable temperature change during charging | −30° C. | +50° C. | 0° C. |
| Coolant | Air, water, water-glycol mix, anti-freeze, Fluorinert ™, ethylene glycol, propylene glycol, any combination thereof, and the like. | | |
| Connector-Port mating sequence | Mated First: coolant flow source, proximity contact, isolation monitor contacts. Mated Last: AC conductor, DC conductor, control signal. | | |
| Conductor materials | Copper, copper-alloys, noble metals, non-noble metals, carbon, diamond, graphite, platinum group metals, and the like. | | |
| Conductor coatings | Copper, copper-alloys, noble metals, non-noble metals, carbon, diamond, graphite, hard gold, hard gold flashed palladium-nickel (e.g., 80/20), tin, silver, diamond-like carbon, platinum-group metals, and the like. | | |

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 11:
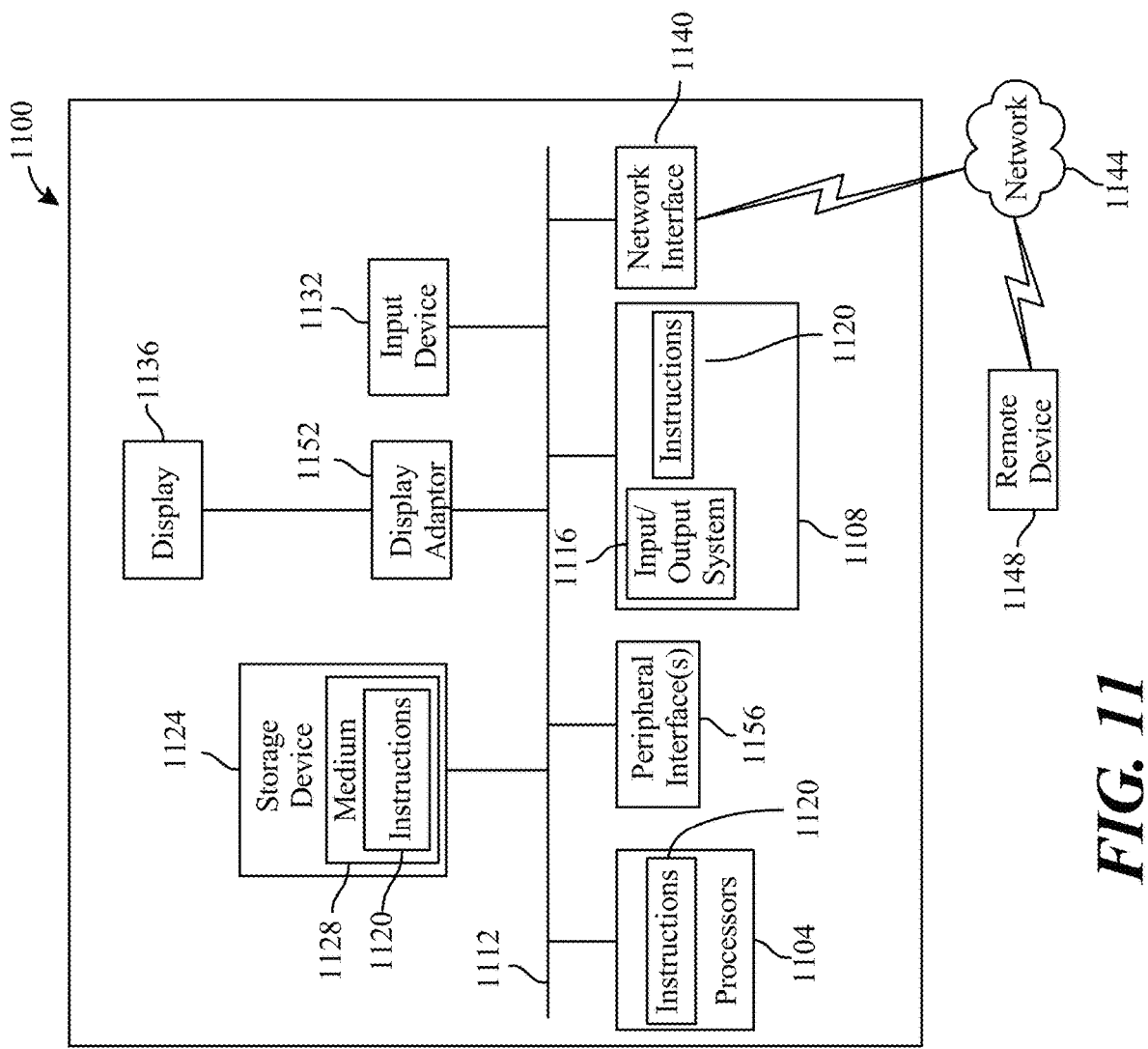
FIG. 11 is a block diagram of a computing system that can be used to implement any one or more of the methodologies disclosed herein and any one or more portions thereof.

FIG. 11 shows a diagrammatic representation of one embodiment of a computing device in the exemplary form of a computer system 1100 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1100 includes a processor 1104 and a memory 1108 that communicate with each other, and with other components, via a bus 1112. Bus 1112 may include any of several types of bus structures including, but not limited to, a memory bus, a memory controller, a peripheral bus, a local bus, and any combinations thereof, using any of a variety of bus architectures.

Processor 1704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 1704 may be organized according to Von Neumann and/or Harvard architecture as a non-limiting example. Processor 1704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC).

Memory 1108 may include various components (e.g., machine-readable media) including, but not limited to, a random-access memory component, a read only component, and any combinations thereof. In one example, a basic input/output system 1116 (BIOS), including basic routines that help to transfer information between elements within computer system 1100, such as during start-up, may be stored in memory 1108. Memory 1108 may also include (e.g., stored on one or more machine-readable media) instructions (e.g., software) 1120 embodying any one or more of the aspects and/or methodologies of the present disclosure. In another example, memory 1108 may further include any number of program modules including, but not limited to, an operating system, one or more application programs, other program modules, program data, and any combinations thereof.

Computer system 1100 may also include a storage device 1124. Examples of a storage device (e.g., storage device 1124) include, but are not limited to, a hard disk drive, a magnetic disk drive, an optical disc drive in combination with an optical medium, a solid-state memory device, and any combinations thereof. Storage device 1124 may be connected to bus 1112 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1124 (or one or more components thereof) may be removably interfaced with computer system 1100 (e.g., via an external port connector (not shown)). Particularly, storage device 1124 and an associated machine-readable medium 1128 may provide nonvolatile and/or volatile storage of machine-readable instructions, data structures, program modules, and/or other data for computer system 1100. In one example, software 1120 may reside, completely or partially, within machine-readable medium 1128. In another example, software 1120 may reside, completely or partially, within processor 1104.

Computer system 1100 may also include an input device 1132. In one example, a user of computer system 1100 may enter commands and/or other information into computer system 1100 via input device 1132. Examples of an input device 1132 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1132 may be interfaced to bus 1112 via any of a variety of interfaces (not shown) including, but not limited to, a serial interface, a parallel interface, a game port, a USB interface, a FIREWIRE interface, a direct interface to bus 1112, and any combinations thereof. Input device 1132 may include a touch screen interface that may be a part of or separate from display 1136, discussed further below. Input device 1132 may be utilized as a user selection device for selecting one or more graphical representations in a graphical interface as described above.

A user may also input commands and/or other information to computer system 1100 via storage device 1124 (e.g., a removable disk drive, a flash drive, etc.) and/or network interface device 1140. A network interface device, such as network interface device 1140, may be utilized for connecting computer system 1100 to one or more of a variety of networks, such as network 1144, and one or more remote devices 1148 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1144, may employ a wired and/or wireless mode of communication. In general, any network topology may be used. Information (e.g., data, software 1120, etc.) may be communicated to and/or from computer system 1100 via network interface device 1140.

Computer system 1100 may further include a video display adapter 1152 for communicating a displayable image to a display device, such as display device 1136. Examples of a display device include, but are not limited to, a liquid crystal display (LCD), a cathode ray tube (CRT), a plasma display, a light emitting diode (LED) display, and any combinations thereof. Display adapter 1152 and display device 1136 may be utilized in combination with processor 1104 to provide graphical representations of aspects of the present disclosure. In addition to a display device, computer system 1100 may include one or more other peripheral output devices including, but not limited to, an audio speaker, a printer, and any combinations thereof. Such peripheral output devices may be connected to bus 1112 via a peripheral interface 1156. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A connector for charging an electric aircraft, the connector comprising:
    a housing configured to mate with a port of an electric aircraft, wherein the housing comprises a fastener for removable attachment with the electric vehicle port;
    a high-voltage conductor disposed at least partially within the housing, the high-voltage conductor configured to conduct high-voltage electrical power;
    a low-voltage conductor disposed at least partially within the housing, the low-voltage conductor configured to conduct low-voltage electrical power;
    an isolation monitor sensor communicatively connected to a controller of the connector, wherein the isolation monitor sensor is further configured to generate an isolation monitoring signal;
    a control signal conductor disposed at least partially within the housing, the control signal conductor configured to conduct a control signal; and
    at least a cooling channel configured to contain a flow of a coolant, wherein each of the high-voltage conductor, the low-voltage conductor, the control signal conductor, and the cooling channel is configured to connect with a mating component of the port of the electric aircraft when the housing is mated with the port.

2. The connector of claim 1, wherein the low-voltage conductor is coaxially disposed within the cooling channel.

3. The connector of claim 1, wherein the high-voltage conductor is coaxially disposed within the cooling channel.

4. The connector of claim 1, wherein the cooling channel physically abuts at least one of the high-voltage conductor and the low-voltage conductor.

5. The connector of claim 1, wherein the cooling channel comprises a plurality of cooling channels.

6. The connector of claim 1, wherein the coolant includes a gas.

7. The connector of claim 1, further comprising a ground conductor disposed at least partially within the housing, the ground conductor configured to conduct to a ground.

8. The connector of claim 1, wherein the high-voltage conductor is further configured to provide electrical power to a power source of the electric aircraft to charge the power source.

9. The connector of claim 4, further comprising a sensor communicatively connected to the power source of the electric aircraft, wherein the sensor is configured to detect a characteristic of the power source.

10. The connector of claim 1, wherein the low-voltage conductor is further configured to provide electrical power to subsystems of the electric aircraft.

11. The connector of claim 6, wherein the low-voltage conductor comprises a direct current (DC) conductor configured to conduct a direct current.

12. The connector of claim 1, wherein the low-voltage conductor comprises an alternating current (AC) conductor configured to conduct an alternating current.

13. The connector of claim 1, further comprising a seal configured to seal the at least a cooling channel and a corresponding mating component together at a joint, when the housing is mated with the port.

14. The connector of claim 1, further comprising:
    a proximity sensor; and
    a controller communicatively connected to the proximity signal sensor via the control signal conductor;

wherein the proximity sensor transmits data related to a position of housing relative to the port of the electric aircraft; and wherein controller initiates a transmission of electrical power through high-voltage conductor and low-voltage conductor as a function of the data from the proximity sensor indicating that the housing is mated to the port of the electric aircraft.

15. The connector of claim 1, wherein the electric aircraft is an electric vertical take-off and landing (eVTOL) aircraft.

16. The connector of claim 1, wherein the controller is communicatively connected to a proximity sensor of the port.

17. The connector of claim 1, wherein the controller is further configured to receive data related to a position of housing relative to the port of electric aircraft.

18. A method of charging an electric aircraft using a connector of a charger, the method comprising:

detecting, by a proximity sensor, data related to a position of a charging connector relative to a port of an electric aircraft;

generating, by an isolation monitoring sensor, an isolation monitoring signal;

receiving, by a controller of the connector that is communicatively connected to the sensor, the data and the isolation monitoring signal;

initiating, by the controller, a transmission of high-voltage electrical power through a high-voltage conductor of the connector to the port and low-voltage electrical power through a low-voltage conductor of the connector to the port;

activating, by the controller, a flow of coolant through at least a cooling channel of the connector.

19. The method of claim 16, wherein the low-voltage conductor is coaxially disposed within cooling channel.

20. The method of claim 16, wherein the high-voltage conductor is coaxially disposed within cooling channel.

* * * * *